(12) United States Patent
Ishihara

(10) Patent No.: US 6,212,147 B1
(45) Date of Patent: Apr. 3, 2001

(54) DISC RECORDING AND/OR REPRODUCING APPARATUS, AND DISC LOADING APPARATUS

(75) Inventor: Hajime Ishihara, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/173,898

(22) Filed: Oct. 16, 1998

(30) Foreign Application Priority Data

Oct. 20, 1997 (JP) .................................................. 9-286906

(51) Int. Cl.⁷ .................................................. G11B 17/03
(52) U.S. Cl. .......................................... 369/77.1; 369/75.1
(58) Field of Search ................................ 369/75.1, 77.1; 312/8.2, 8.4, 8

(56) References Cited

U.S. PATENT DOCUMENTS

| | | | |
|---|---|---|---|
| 3,471,972 | * 10/1969 | Wamboldt | 312/8.2 |
| 3,572,866 | * 3/1971 | Wolanin | 312/8.4 |
| 4,170,771 | * 10/1979 | Bly | 350/331 |
| 4,337,533 | * 6/1982 | Ando et al. | 369/75.2 |
| 4,356,594 | * 11/1982 | Grosemans | 16/256 |
| 4,403,317 | * 9/1983 | Suzuki et al. | 369/75.2 |
| 4,447,900 | * 5/1984 | Schatteman et al. | 369/200 |
| 4,561,084 | * 12/1985 | Satake et al. | 369/75.2 |
| 4,744,072 | * 5/1988 | Tamaki et al. | 369/75.2 |
| 4,815,066 | * 3/1989 | Horvath | 369/79 |
| 4,839,881 | * 6/1989 | Takahara et al. | 369/75.2 |
| 5,010,428 | * 4/1991 | d'Arc | 360/99.06 |
| 5,016,236 | * 5/1991 | Cho | 369/75.2 |
| 5,181,197 | * 1/1993 | Sugie et al. | 369/75.1 |
| 5,335,217 | * 8/1994 | Kaneda et al. | 369/77.2 |
| 5,572,399 | * 11/1996 | Shirato et al. | 361/680 |
| 5,610,891 | * 3/1997 | Choi | 369/77.2 |
| 5,668,790 | * 9/1997 | Koizumi et al. | 369/194 |
| 5,689,490 | * 11/1997 | Pollard | 369/75.1 |
| 5,754,502 | * 5/1998 | Kamemura | 369/37 |
| 5,777,958 | * 7/1998 | Matumoto et al. | 369/37 |
| 5,781,523 | * 7/1998 | Ozawa et al. | 369/77.1 |
| 5,793,729 | * 8/1998 | Soga et al. | 369/77.1 |
| 5,805,554 | * 9/1998 | Suzuki et al. | 369/77.1 |
| 5,831,956 | * 11/1998 | Sawai et al. | 369/75.2 |
| 5,907,529 | * 5/1999 | Permut | 369/77.2 |

FOREIGN PATENT DOCUMENTS

| | | | |
|---|---|---|---|
| 0114358 | * 7/1983 | (JP) | 369/75.1 |
| 58-114358 | * 7/1993 | (JP) . | |

\* cited by examiner

Primary Examiner—David L. Ometz
Assistant Examiner—Franklin D. Altman
(74) Attorney, Agent, or Firm—Andrew V. Smith

(57) ABSTRACT

A disc recording and/or reproducing apparatus comprises an opening, a closing member, a tray and a drive mechanism. The opening is formed at the front of the apparatus. The closing member closes and discloses the opening. The tray receives a disc thereon. The tray is moved between a first position where the tray is projected out of the opening and generally perpendicular to the front of the apparatus and a second position where the tray is retracted into the enclosure through the opening and generally parallel to the front of the apparatus. The tray drive mechanism moves the closing member between a position where the closing member discloses the opening and a position where the closing member closes the opening, and the tray between the above-mentioned first and second positions.

35 Claims, 26 Drawing Sheets

DISC RECORDING AND/OR REPRODUCING APPARATUS, AND DISC LOADING APPARATUS

BACKGROUND OF THE INVENTION

1. Field of the Invention

The present invention relates to a disc recording and/or reproducing apparatus, and a disc loading apparatus, and more particularly to a disc recording and/or reproducing apparatus and a disc loading apparatus, adopting a disc tray.

2. Description of Related Art

An optical disc player has been proposed for recording or reproduction, or both, of information signal into and from a recording medium, for example, an optical disc such as a so-called compact disc (CD).

Such an optical disc player has a tray provided drawably from the front opening of the player body and on which an optical disc is to be set, and a door provided movably in relation to the player body to close and disclose the front opening. In such an optical disc player, when the door has moved along the front of the player body to disclose the front opening, the tray is drawn from inside the player body to a drawout position where a disc may be set onto, or removed from on, the tray.

Generally, for the user to operate the optical disc player more easily, a control panel having various controls disposed thereon and a display such as an LCD display are provided on the front surface of the player to which the tray is drawn out from inside the player for setting or removing an optical disc.

However, since the above-mentioned conventional disc player is designed so that the door is moved along the front of the player to disclose the front opening, the control panel and display cannot be provided anywhere along the door moving path. In case the control panel is provided in a position along the door moving path, the door moved until the front opening is disclosed will screen the control panel, making it difficult or impossible to easily operate the control panel.

Such use of a part of the front of the player body as the door moving path will limit the space for disposition of the control panel and display, which will lead to a larger design of the optical disc player.

The door having moved from a position where it discloses the front opening to a position where it closes the front opening will cause it difficult for the user to see the markings provided on the front surface of the player, the display and indications on the display, and will also spoil the esthetic appearance of the player as a whole.

Furthermore, the tray does not start being drawn out before the door has moved to fully disclose the front opening, which add will to the operation time for each disc playing.

SUMMARY OF THE INVENTION

It is therefore an object of the present invention to provide a disc recording and/or reproducing apparatus which resolves the above-mentioned problem.

It is another object of the present invention to provide a disc loading apparatus which resolves the above-mentioned problem.

According to the present invention, there is provided a disc recording and/or reproducing apparatus including an opening, a closing member, a tray and a drive mechanism. The opening is formed at the front of the apparatus. The closing member closes and discloses the opening. The tray receives a disc thereon. The tray is moved between a first position where the tray is projected out of the opening and generally perpendicular to the front of the apparatus and a second position where the tray is retracted into the apparatus through the opening and generally parallel to the front of the apparatus. The tray drive mechanism moves the closing member between a position where the closing member discloses the opening and a position where the closing member closes the opening, and the tray between the above-mentioned first and second positions.

According to the present invention, there is provided a disc recording and/or reproducing apparatus including an opening, a closing member, a tray and a drive mechanism. The opening is formed at the front of the apparatus. The closing member closes and discloses the opening. The closing member is moved between a position where it closes the opening and is in a generally same plane as the front surface of the apparatus and a position where it discloses the opening inside the apparatus. The tray receives a disc thereon. The tray is moved between a first position where it is projected out of the opening and a second position where it is drawn into the apparatus through the opening. The drive mechanism moves the closing member between a position where the closing member discloses the opening and a position where the closing member closes the opening, and the tray between the above-mentioned first and second positions.

According to the present invention, there is provided a disc loading apparatus including a tray, a drive mechanism and a guiding member. The tray has a disc mount surface on which a disc is to be set. The tray is moved between a first position where the disc mount surface of the tray is generally horizontal and a second position where the disc mount is generally perpendicular to that when the tray is in the first position, the second position being deeper than the first position in the apparatus. The drive mechanism moves the tray between the above-mentioned first and second positions. The guiding member guides the tray being moved by the drive mechanism between the first and second position.

BRIEF DESCRIPTION OF THE DRAWINGS

These objects and other objects, features and advantages of the present intention will become more apparent from the following detailed description of the present invention when taken in conjunction with the accompanying drawings, of which:

FIGS. 21 through 25 show the movement of tray and door, of which:

FIG. 21 is a side elevation, enlarged in scale, showing the tray located in place inside the apparatus and the door being closed;

FIG. 22 is a side elevation, enlarged in scale, showing the slider moved so that the guided shaft comes to the boundary between the guide part and locking part of the guide hole formed in the slider;

FIG. 23 is a side elevation, enlarged in scale, showing the door moved as the slider moves;

FIG. 24 is a side elevation, enlarged in scale, showing both the tray and door moved; and FIG. 25 is a side elevation, enlarged in scale, showing the tray in the drawn-out position and the door in the opened position;

FIGS. 26 to 29 show the positional relation between the sliding pin and tray, of which FIG. 26 is a sectional view, enlarged in scale, showing the sliding pin located at one end of the standby wall of the recess in the cam;

FIG. 27 is a sectional view, enlarged in scale, showing the cam gear rotated so that the sliding pin is located at the intermediate point of the cam recess;

FIG. 28 is a sectional view, enlarged in scale, showing the sliding pin moved to the acting wall of the cam recess so that the gear part of the cam gear is in mesh with the rack; and FIG. 29 is a sectional view, enlarged in scale, showing the tray being moved as the cam gear rotates.

DETAILED DESCRIPTION OF THE PREFERRED EMBODIMENTS

The embodiment of the present invention, which will be described hereunder, is applied to a recording and/or reproducing apparatus adapted to reproduce a signal from either a so-called disc or a cassette tape, or to record a signal reproduced from a disc into a tape cassette.

First, the general configuration of the recording and/or reproducing apparatus according to the present invention will be described herebelow.

Figure 1:
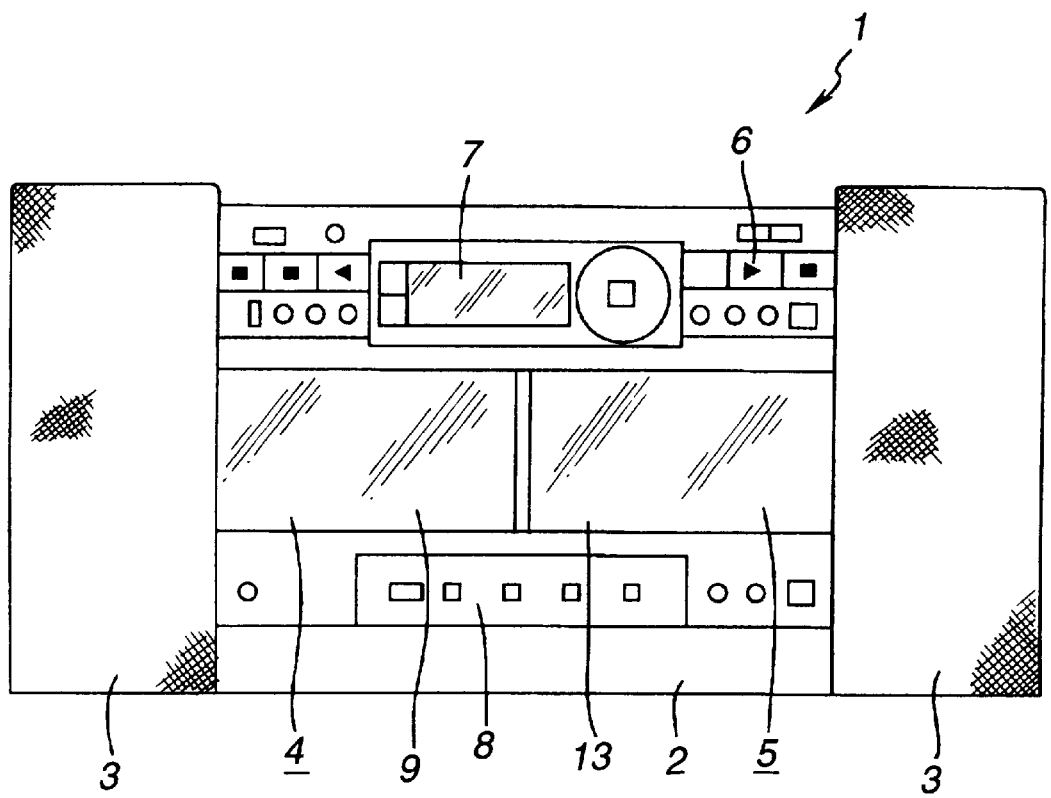
FIG. 1 is a front view of an embodiment of recording and/or reproducing apparatus according to the present invention.
Figure 2:
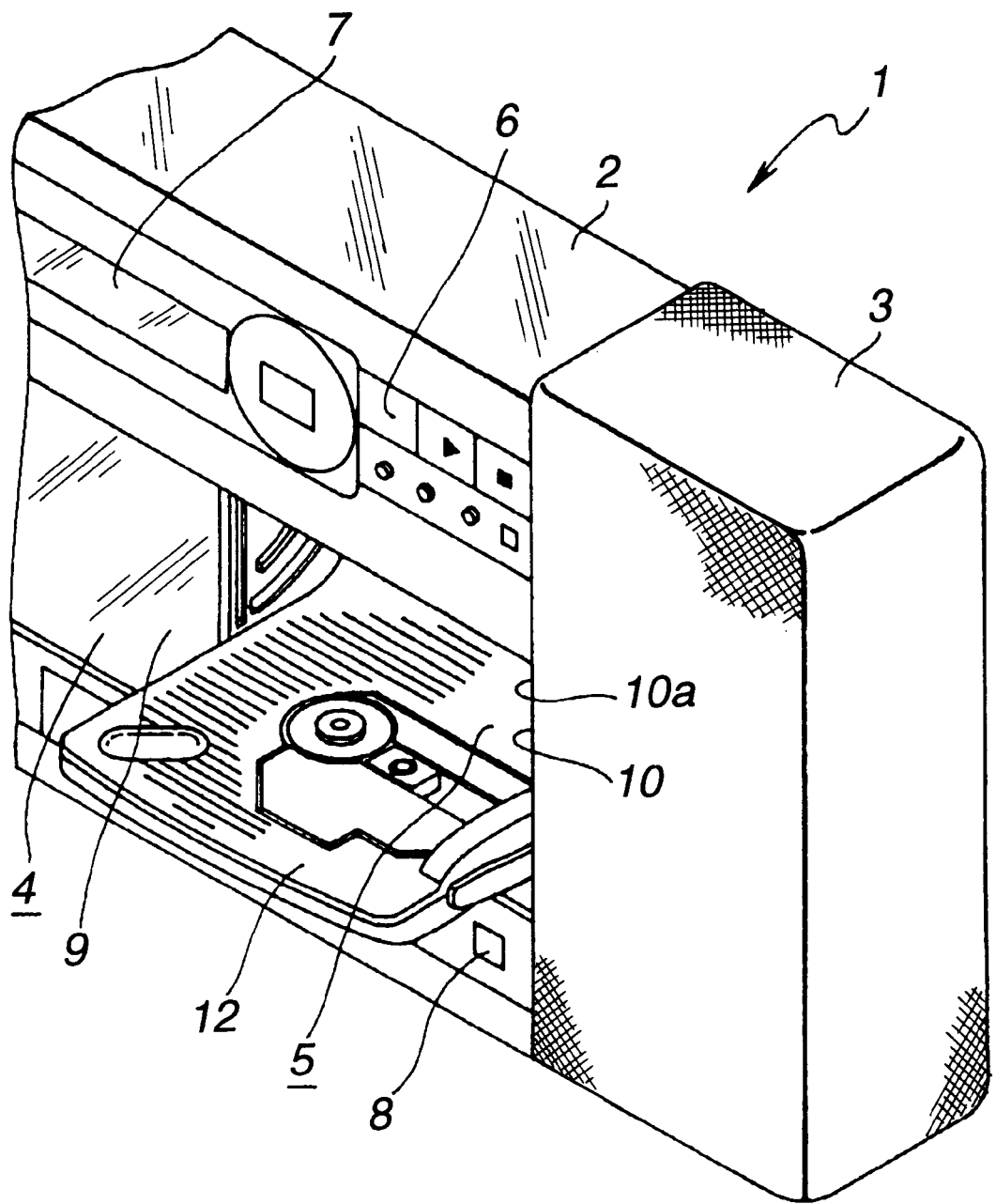
FIG. 2 is a perspective view of a portion of the embodiment of recording and/or reproducing apparatus in FIG. 1.

Referring now to FIGS. 1 and 2, there is illustrated a recording and/or reproducing apparatus generally indicated with a reference 1. The apparatus 1 has an enclosure 2 incorporating a speaker 3 on either side, left and right, thereof The enclosure 2 also has a tape cassette player 4 and disc player 5 disposed side by side at the left and right thereof, respectively. Also the enclosure 2 has provided at the front side thereof above the tape cassette player 4 and disc player 5 a control panel 6 having disposed thereon a plurality of controls for playing a tape cassette and disc such as a CD and a display 7 providing indications related to the tape cassette and disc playing, etc. Furthermore, there are disposed at the front of the enclosure 2 below the tape cassette player 6 and disc player 6 another control panel 8 having disposed thereon a plurality of controls for allowing the recording and/or reproducing apparatus 1 to perform its various functions. The speakers 3 deliver an audible sound produced from a reproduced signal output from the tape cassette player 4 or disc player 5.

The tape cassette player 4 has a revolving door 9 which opens and closes a cassette receiver (not illustrated) provided inside the enclosure 2 and in which a tape cassette is to be set. The revolving door 9 is pivoted at the lower end thereof to the enclosure 2 to open and close the cassette receiver. The tape cassette player 4 records or reproduces an information in to or from a cassette tape set in the cassette receiver.

Figure 3:
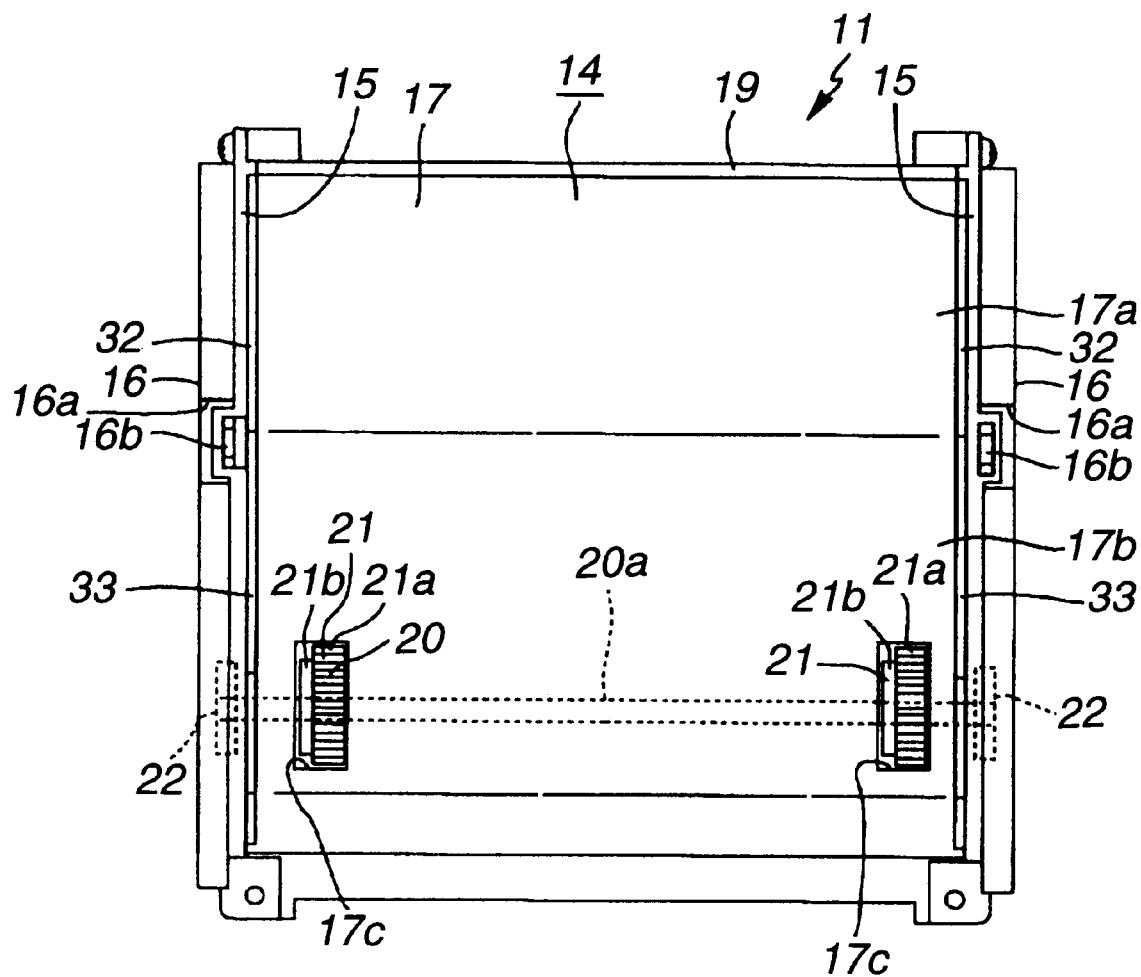
FIG. 3 is a front view, enlarged in scale, of the support block.

As shown in FIG. 3, the disc player 5 has a support block 11 provided in an opening 10 formed at the front of the enclosure 2, a tray 12 movably supported on the support block 11, and a door 13 movably supported on the support block 11 to disclose and close a front portion 10a of the opening 10. The disc player 5 reproduces an information from a disc as will be described later.

The support block 11 comprises a support chassis 14, side plates 15 installed on the support chassis 14, and side covers 16 installed on the support chassis 14 to cover the side plates 15, as shown in FIG. 3.

Figure 4:
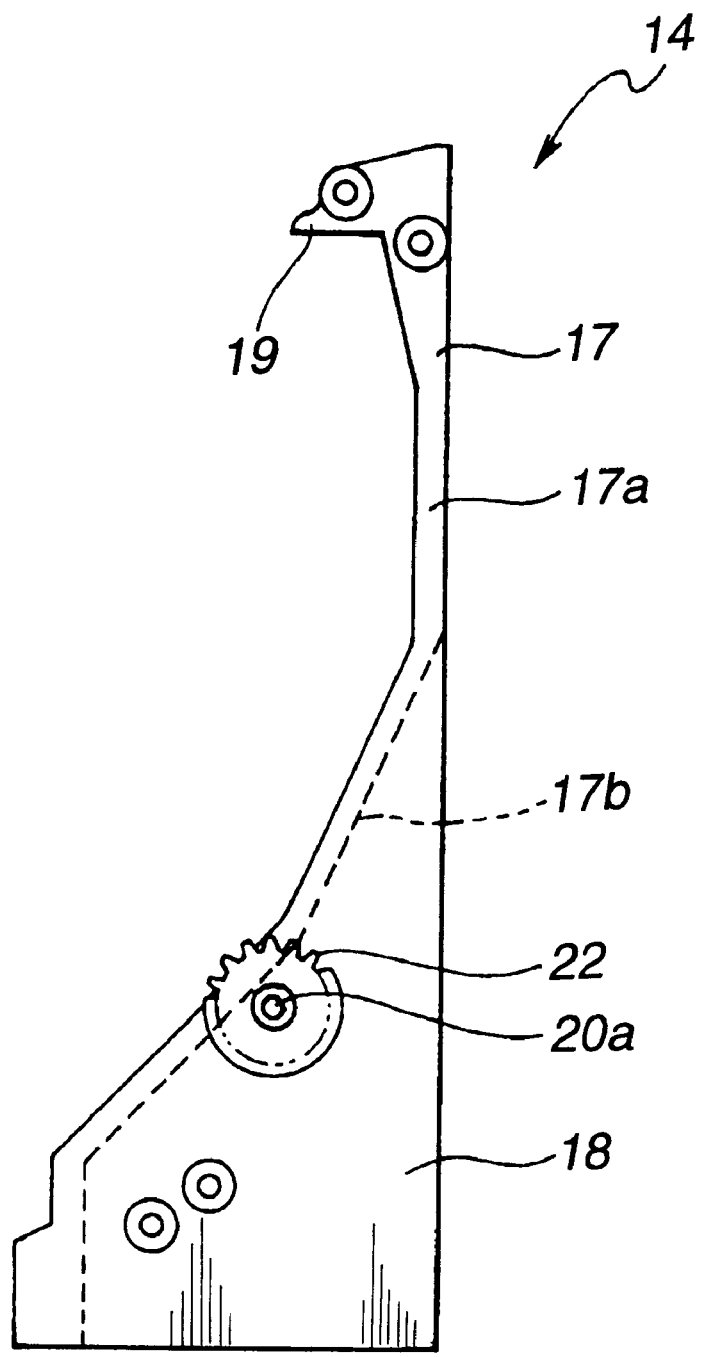
FIG. 4 is a side elevation, enlarged in scale, of the support chassis.

As seen from FIGS. 3 and 4, the support chassis 14 consists of a main portion 17, lateral portions 18 projecting backward from either horizontal edge of the main portion 17, and a top portion 19 projecting forward from the upper edge of the main portion 17. The main, lateral and top portions 17, 18 and 19 are formed integrally with each other.

The main portion 17 of the support chassis 14 further includes in two thirds thereof a vertical portion 17a which will be directed nearly perpendicularly to the apparatus 1 when the revolving door 9 is fully opened, and a sloped portion 17b contiguous to the vertical portion 17a and gently descending at it goes to the front of the apparatus 1. The sloped portion 17b has an elongated hole 17c formed nearly in the middle thereof and on either side, right and left, thereof. The elongated hole 17c is directed alone the lateral portion 18.

Each of the lateral portions 18 is formed contiguously and perpendicularly to the lateral edge of the sloped portion 17b. The lateral portions 18 are generally triangular when viewed from the lateral side of the support chassis 14. Further, the lateral portions 18 extend vertically and backwardly of the apparatus 1. The antero-posterior length, along the lower side, of the lateral portion 18 is approximately 3 times larger than the length of the top portion 19 projected from the upper edge of the main portion 17.

As shown in FIG. 3, the lateral portions 18 support a transmission mechanism 20 provided to transmit a moving force to the tray and door as will be described later. The transmission mechanism 20 is comprised of two cam gears 21, two spur gears 22 and a synchronization shaft 20a which rotates the gears 21 and 22 synchronously with each other.

The synchronization shaft 20a is slightly longer than the width of the support chassis 14, namely, it projects at the opposite ends thereof, respectively, from the sloped portion 17b. The synchronization shaft 20a is positioned, except for both the end portions thereof, behind the sloped portion 17b and supported rotatably at the end portions thereof on the lateral portions 18. The spur gears 22 are fixed on the synchronization shaft 20a at the ends thereof, and the cam gears 21 are fixed on near-end portions of the synchronization shaft 20a. Thus the spur gears 22 are positioned outside the lateral portions 18, respectively, and the cam gears 21 located near the respective ends of the synchronization shaft 20a are partially projected forward out of the elongated holes 17c formed in the sloped portions 17b of the support chassis 14.

Figure 5:
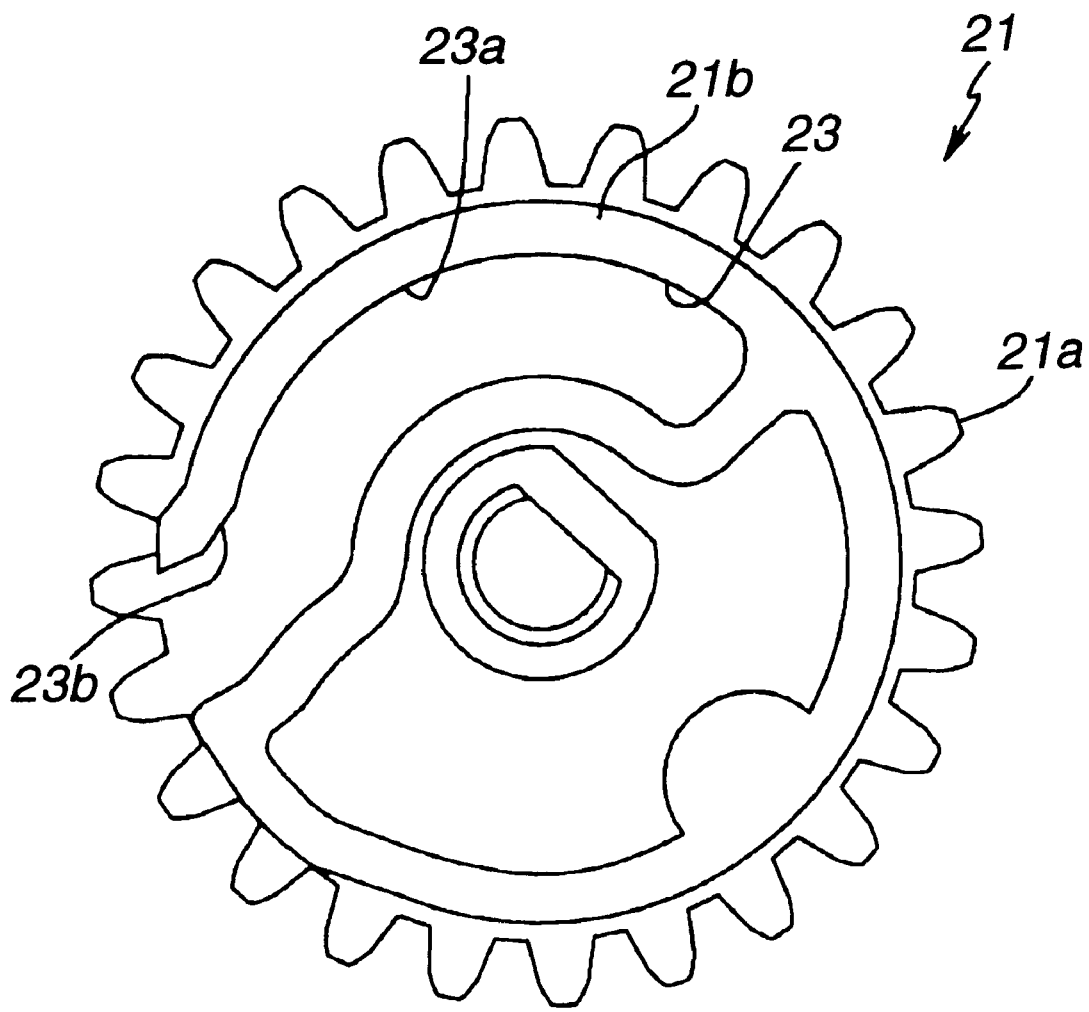
FIG. 5 is a side elevation, enlarged in scale, of the cam gear.

As shown in FIG. 5, each of the cam gear 21 consists of a toothed portion 21a located at the right side, a cam portion 21b integrally formed with the toothed portion 21a and projected from the left end of the toothed portion 21b, and a cam recess 23 formed in the cam portion 21b and open at the left of the cam portion 21b.

The cam recess 23 has a standby part 23a extending circularly about the center of rotation of the cam gear 21 and an 23b contiguous to the counterclockwise end of the standby part 23a as viewed from the left and extending towards the outer circumference of the cam gear 21. As shown in FIG. 3, the cam gears 21 are fixed so that the cam recesses 23 to the synchronization shaft 20a are positioned symmetrically with respect to the middle of the synchronization shaft 20a.

There are provided between the sloped portion 17b of the support chassis 14 a drive mechanism including a motor, worn, worm wheel, etc. (not shown) and intended to rotate the transmission mechanism 20.

Figure 6:
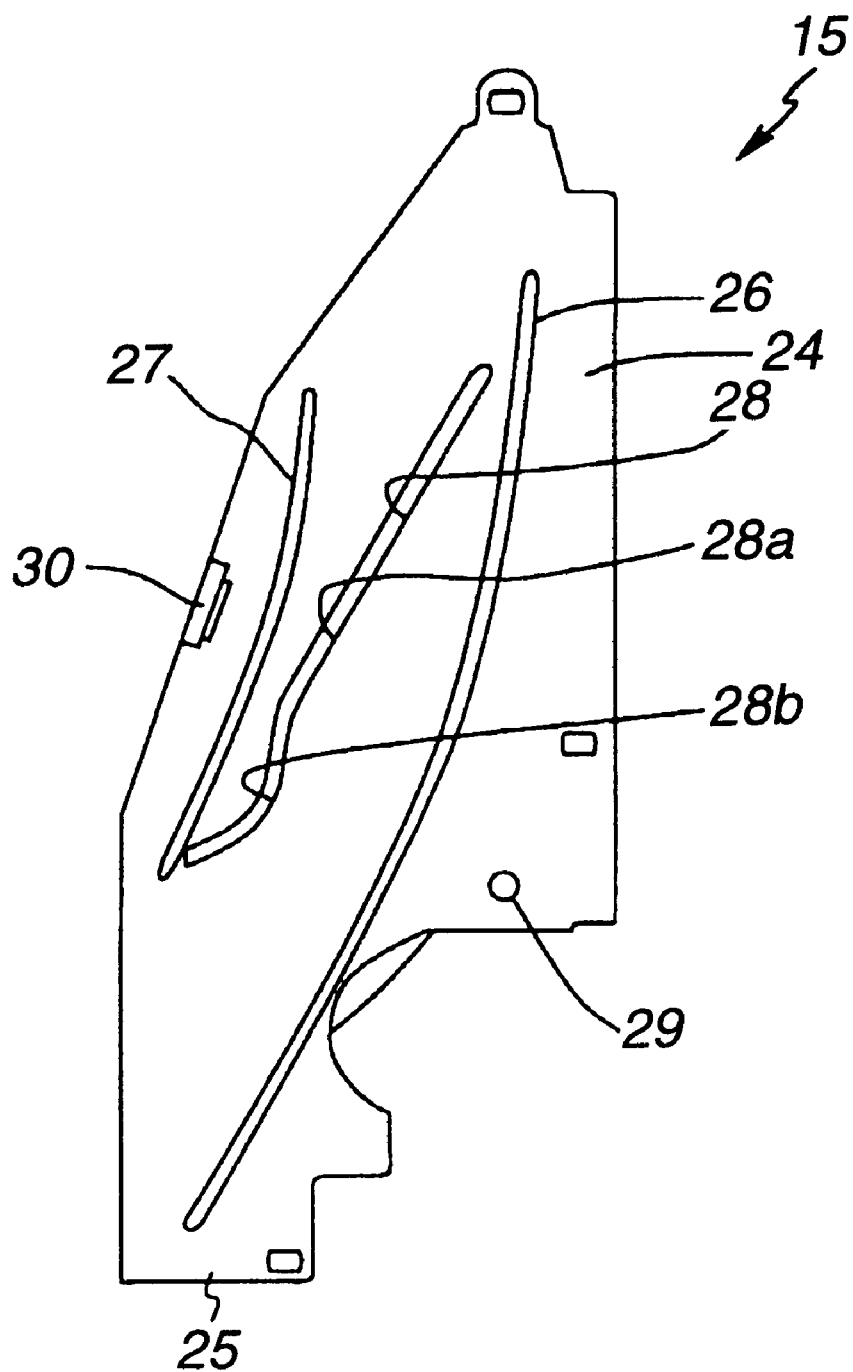
FIG. 6 is a side elevation, enlarged in scale, of the side plate, showing the outer side thereof.

As seen from FIG. 6, each of the side plates 15 includes an upper portion 24 occupying about two thirds of the entire side plate 15, and a lower portion 25 below the upper portion 24. The upper portion 24 has the general form of a right-angled triangular. It is defined by a front sloped edge bulging forward as it goes downward, a rear edge extending vertically, and a lower edge extending horizontally. The lower portion 25 extends downward from a position somewhat higher than the lower end of the upper portion 24 and has the general form of a vertically long rectangle.

The side plate 15 has a gently curved guide rail 26 formed on the outer surface thereof over the upper portion 24 and lower portion 25 thereof. The guide rail 26 is formed convex obliquely downward, and has an upper end located more deeply than a lower end thereof from the front. Further there is also formed on the outer surface of the upper portion 24 an auxiliary gently sloped guide rail 27 located before the guide rail 26. The auxiliary guide rail 27 is parallel to and shorter than the guide rail 26.

Furthermore, there is formed a guide recess 28 between the guide rail 26 and auxiliary guide rail 27 on the outer surface of the upper portion 24. The guide recess 28 has an upper end positioned somewhat lower than the upper end of the guide rail 26 and a lower end located near the lower end of the auxiliary guide rail 27. The guide recess 28 has an upper portion equal to about two thirds thereof formed to be straight and extend obliquely downward, as indicated with a reference 28a, and the remainder, a lower portion, equal to one third thereof formed to be circular, being obliquely convex backward and downward, as indicated with a reference 28b.

The upper portion 24 has a projecting support shaft 29 in a position at the lower end of the outer surface thereof near the read end, and an engagement concavity 30 in the sloped edge thereof, nearer to the lower end. The engagement concavity 30 is partially projected out.

Figure 7:
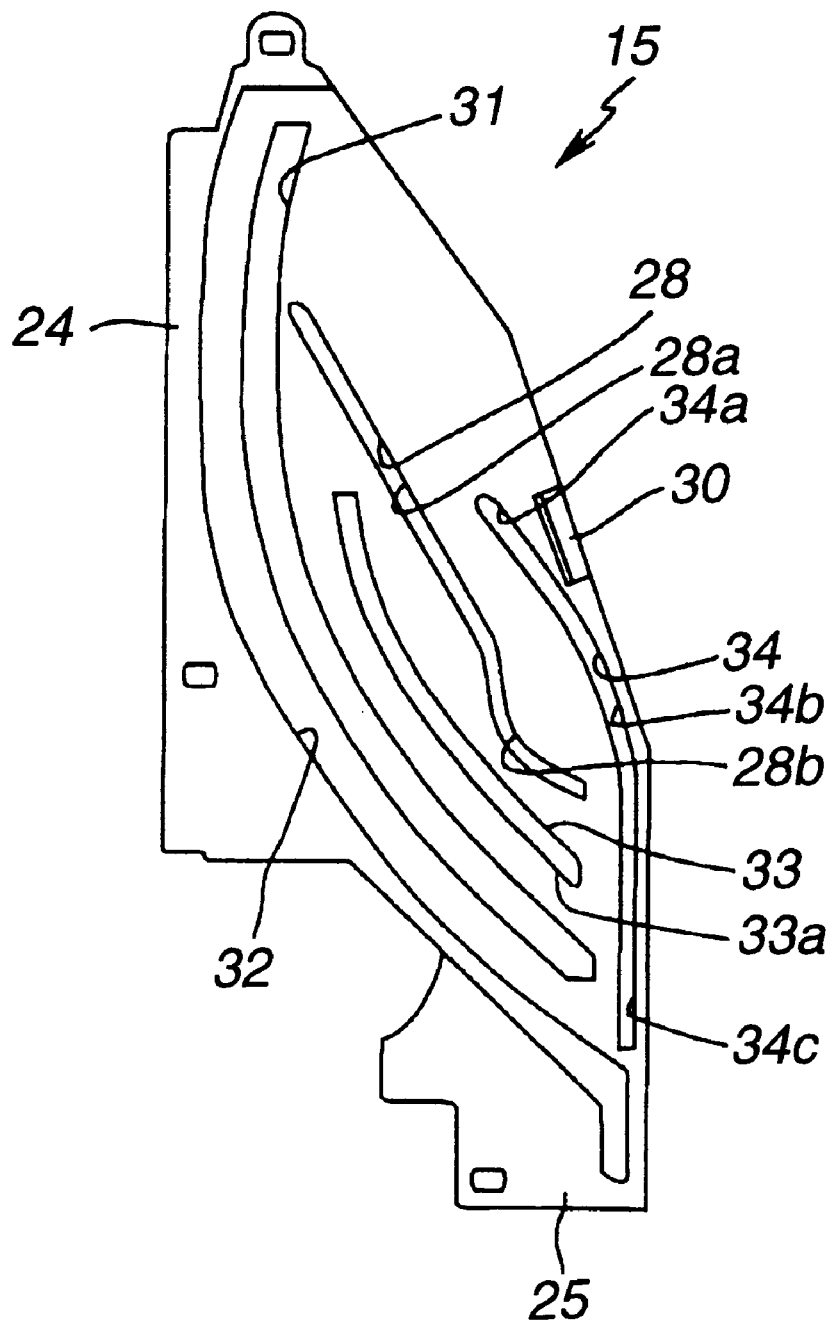
FIG. 7 is a side elevation, enlarged in scale, of the side plate, showing the inner side thereof.

As shown in FIG. 7, the side plate 15 has a long circular guide recess 31 formed on the inner surface thereof The guide recess 31 is obliquely convex rearward and downward, and has an upper end located more deeply than a lower end thereof from the front. A circular rear auxiliary guide edge 32 is formed behind the guide recess 31 on the inner surface of the side plate 15. The rear auxiliary guide edge 32 is parallel to the guide recess 31. Also a short circular projection 33 is formed before the guide recess 31 on the inner surface of the side plate 15. The projection 33 has a front auxiliary guide edge 33a opposite to the rear auxiliary guide edge 32 provided behind the guide recess 31. The front auxiliary guide edge 33a is parallel to the guide recess 31.

Furthermore, the side plate 15 has a support recess 34 formed on the inner surface thereof to be along the front edge thereof. The support recess 34 consists of an upper straight portion 34a, a circular portion 34b, and a lower straight portion 34c. The upper straight portion 34a extends obliquely upward. It is located near the lower end of the upper portion 24 and is relatively short. The lower straight portion 34c is long and extends vertically along the front edge of the lower portion 25. The circular portion 34b is convex forward and upward, and serves as a coupling between the lower end of the upper straight portion 34a and upper end of the lower straight portion 34c.

Figure 8:
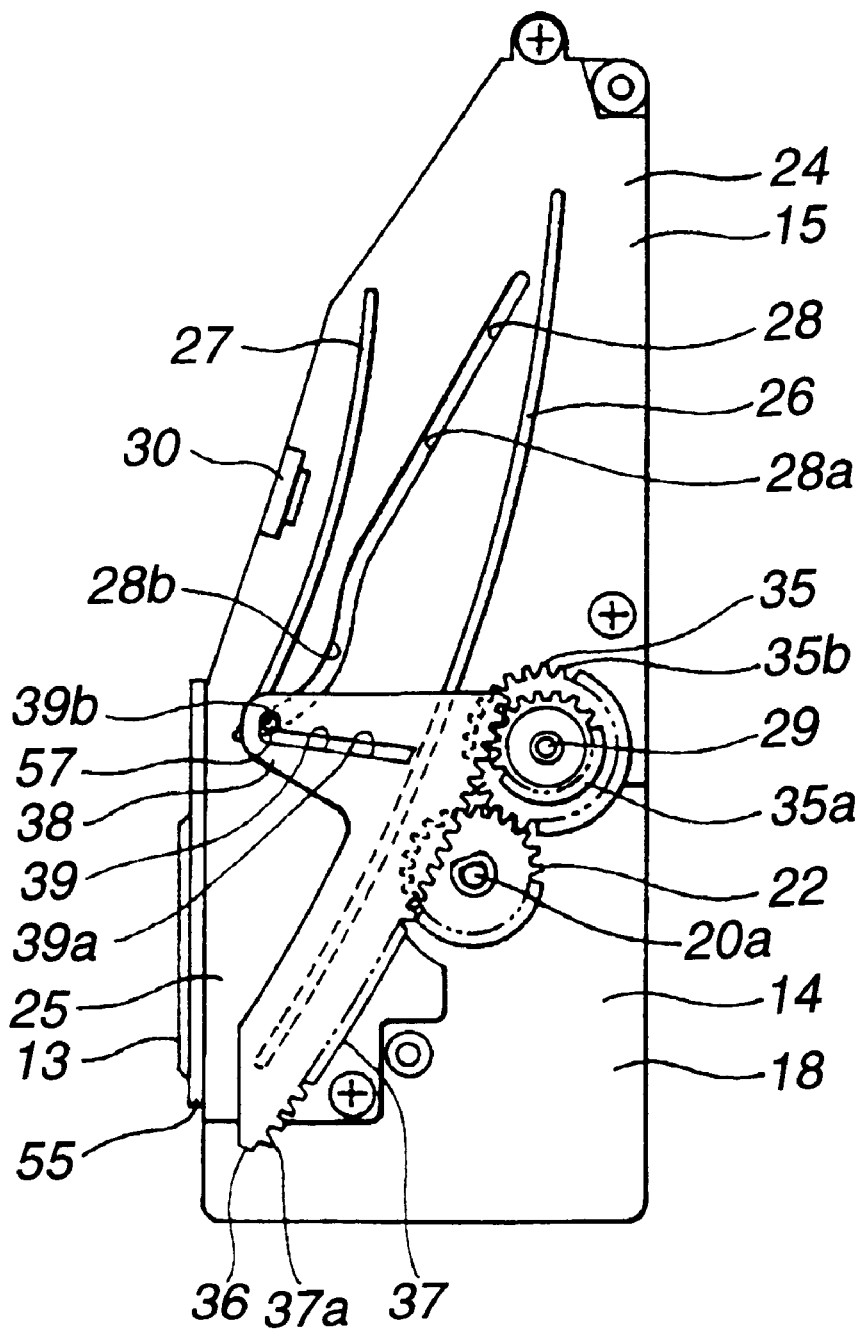
FIG. 8 is a side elevation, enlarged in scale, of the support block with the side cover removed.

As shown in FIG. 8, the side plate 15 is fixed to the lateral portion 18 of the support chassis 14 by screwing from outside the latter. With the side plate 15 installed to the side portion 18, a double gear 35 is installed on the support shaft 29.

The double gear 35 has a small-diameter gear portion 35a located outside thereof, and a large-diameter gear portion 35b located inside thereof, the gear portions 35a and 35b being formed integrally with each other. The large-diameter gear portion 35b is in mesh with the spur gear 22 of the transmission mechanism 20.

Figure 9:
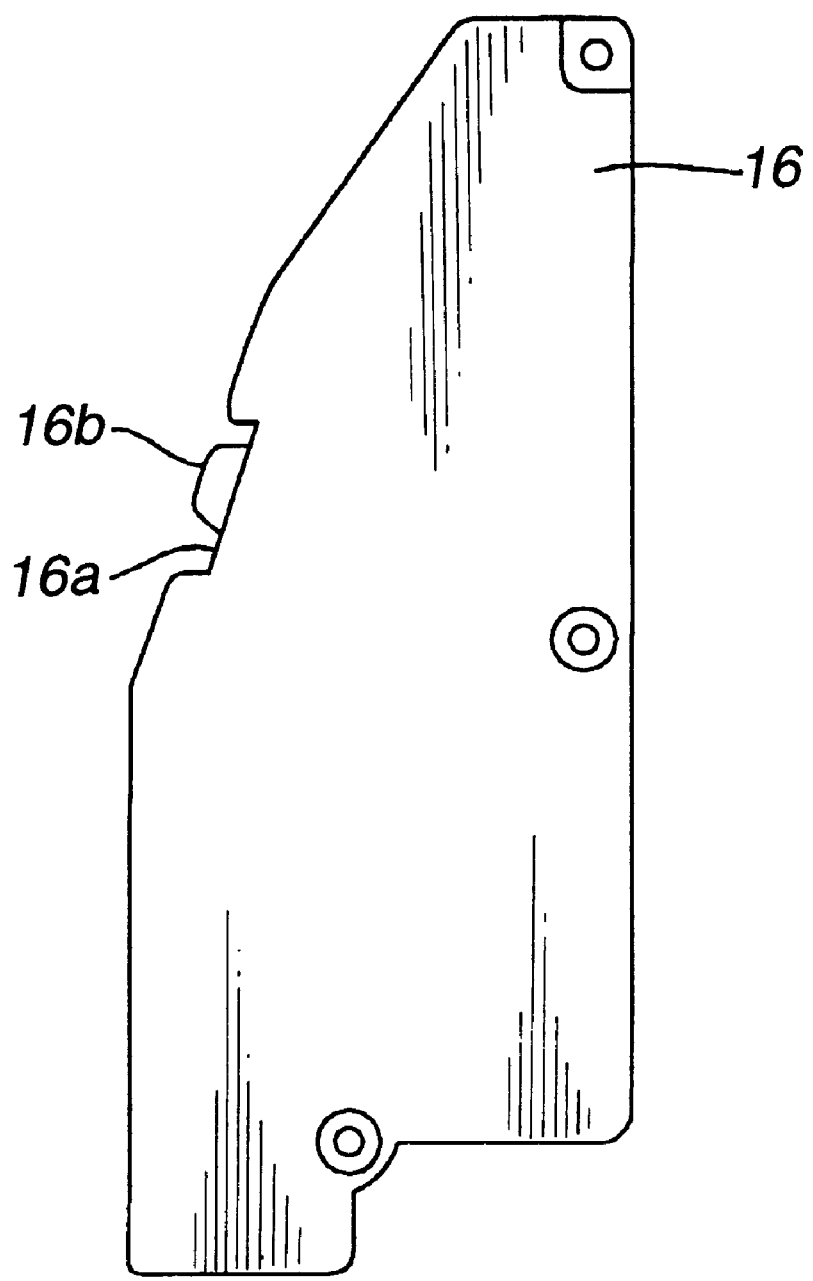
FIG. 9 is a side elevation, enlarged in scale, of the side cover, showing the outer side thereof.

As shown in FIG. 9, each of the side covers 16 is shaped to cover the side plate 15 and lateral portion 18 generally as a whole when the side plate 15 is installed to the lateral portion 18 of the support chassis 14. The upper half of the side cover 16 is shaped at the front edge thereof to be sloped similar to the side plate 15. The side cover 16 has formed, in a position near the lower end of the sloped edge thereof, a cut 16a in the middle of which a forward projecting engagement piece 16b.

Figure 10:
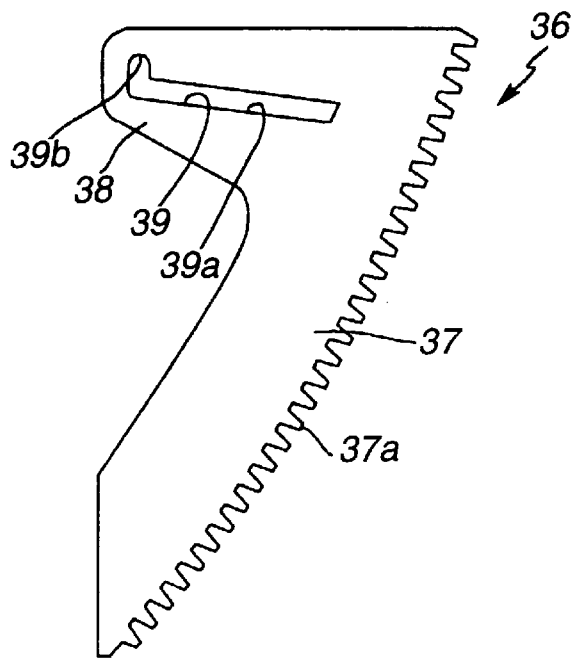
FIG. 10 is a side elevation, enlarged in scale, of the slider, showing the outer side thereof.
Figure 11:
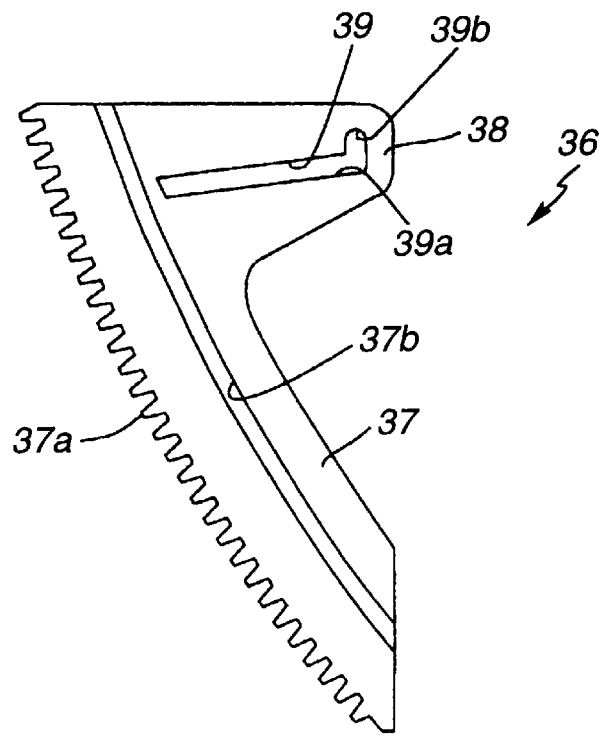
FIG. 11 is a side elevation, enlarged in scale, of the slider, showing the inner side thereof.

As shown in FIGS. 8, 10 and 11, the side plate 15 has a slider 36 slidably supported on the guide rail 26 thereof The slider 36 consists of a to-be-supported main body 37 and a projection 38, integrally formed with each other.

The to-be-supported main body 37 is formed gently and has a rear toothed edge 37a. As shown in FIG. 11, the main body 37 has formed on the inner surface thereof an engagement recess 37b extending from the upper end to lower end thereof and having a same curvature as the guide rail 26.

The above-mentioned projection 38 is projected from the upper end of the main body 37 and has formed therein an engagement hole 39 including a guide part 39a extending linearly and a locking part 39b being short and extending generally upward from the front end of the guide part 39a.

In the slider 36, the distance from the engagement recess 37b to the front end of the projection 38 is slightly longer than that between the guide rail 26 and auxiliary guide rail 27 formed on the side plate 15.

[0039]

As shown in FIG. 8, the slider 36 has the to-be-supported main body 37b thereof engaged slidably on the guide rail 26 and has the toothed edge 37a thereof put, at this time, into mesh with the small-diameter gear portion 35a of the double gear 35 supported on the lateral side 18 of the support chassis 14. With the slider 36 thus supported, the engagement piece 16b of the side cover 16 is engaged in the engagement concavity 30 in the side plate 15, and the side cover 16 is fixed to the support chassis 14 by screwing from outside the side plate 15.

When the side cover 16 is installed to the support chassis 14, there is defined a predetermined spacing between the side cover and cover plate 15 and thus the slider 36 is slidably positioned between the side plate 15 and side cover 16. When the transmission mechanism 20 is rotated by the drive mechanism (not illustrated), the double gear 35 in mesh with the spur gear 22 feeds the toothed edge 37a so that the slider 36 is moved under the guidance by the guide rail 26.

When the slider 36 is thus moved, it slides at the outer surface thereof on the inner surface of the side cover 16. Since the distance from the engagement recess 37b to the front end of the projection 38 is slightly longer than that between the guide rail 26 and auxiliary guide rail 27 formed on the side plate 15, the front end of the inner surface of the projection 38 of the slider 36 slides on the auxiliary guide rail 27. The auxiliary guide rail 27 is provided to allow the slider 36 to thus keep moving on a way defined by the auxiliary guide rail 27, thereby preventing the slider 36, when being moved, from wobbling in a direction perpendicular to the plane of the slider 36.

Figure 12:
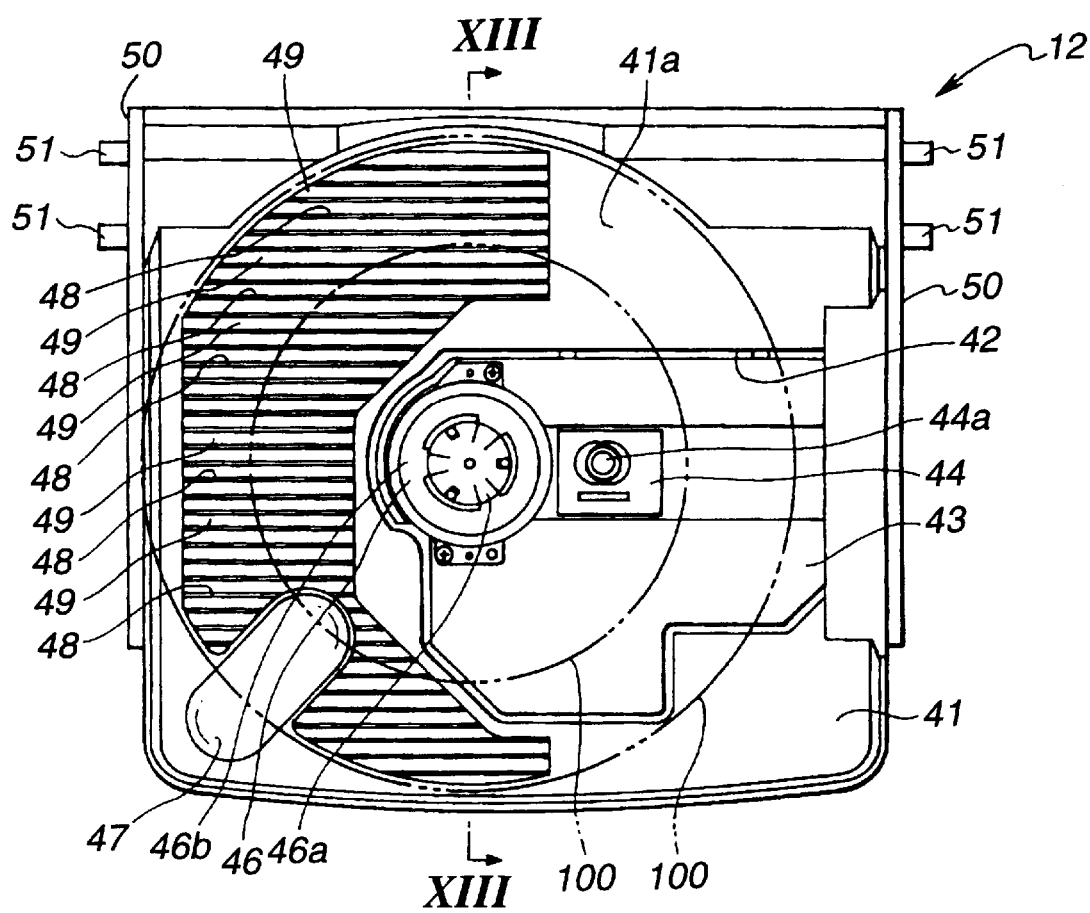
FIG. 12 is a plan view, enlarged in scale, of the tray.
Figure 13:
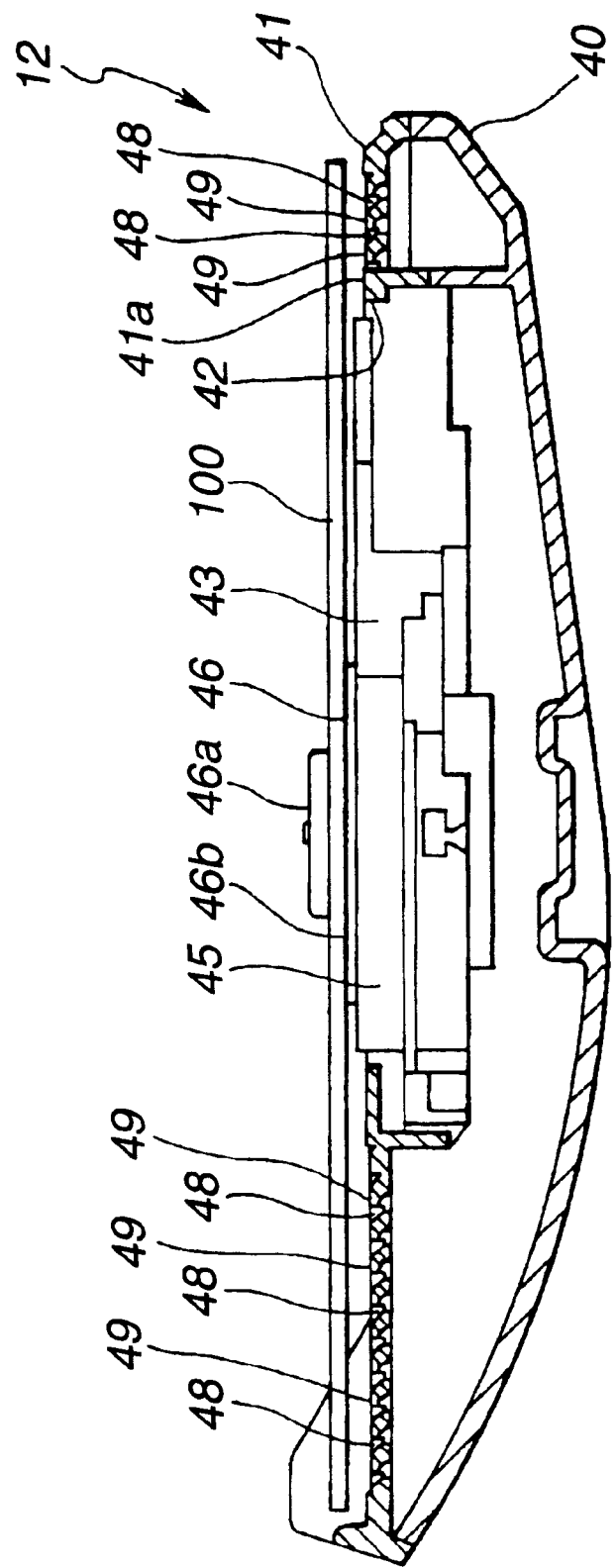
FIG. 13 is a sectional view, enlarged in scale, of the tray taken along the line XIII—XIII in FIG. 12.

As shown in FIGS. 12 and 13, the tray 12 includes a lower member 40 formed like a shallow dish open at the top thereof, and an upper member 41 formed generally flat to cover the top opening of the lower member 40.

The tray 12 can be drawn out, and received into, the enclosure 2 as will be described later. When it is received in the enclosure 2, it takes a position generally parallel to the front of the enclosure 2, namely, it is generally upright. When it is drawn out of the enclosure 2, it is generally perpendicular to the front of the enclosure 2, that is, it takes a generally horizontal position. More particularly, when the tray 12 is received in the enclosure 2, a disc mount 46b of a disc table 46 provided on the tray 12 as will be described later will be generally perpendicular to the disc mount 46b when the tray is drawn out of the enclosure 2.

The upper member 41 has formed in a portion thereof a large opening 42 in which an optical pickup 44 and spindle motor 45 are disposed on a support member 43 having a generally same shape as that of the opening 42.

The optical pickup 44 comprises an objective lens 44a, and is movable radially of a disc 100 (a so-called compact disc of 12 cm or 8 cm in diameter) which will be mounted on the tray 12 by a disc feed mechanism (not illustrated).

The disc table 46 for receiving the optical disc 100 is fixed atop a rotating shaft of the disc table 46. The disc table 46 has provided integrally in the center thereof a centering guide 46a which is to be fitted in a center hole in the disc 100. The disc 100 is to be set on the upper surface of the disc table 46 where the centering guide 46a does not exist. The upper surface serves as the disc mount 46b. The disc mount 46b is positioned slightly higher than a disc mount surface 41a of the upper member 41 which faces the disc 100.

When the disc 100 is set on the disc mount 46b, the centering guide 46a is fitted into the center hole of the disc 100. The centering guide 46a has a plurality of support balls held on the outer circumference thereof and which are forced radially. Thus the miner wall of the center hole of the disc 100 is resiliently retained by the plurality of support balls.

The tray 12 has disposed therein an internal mechanism including printed circuit boards on which there are formed necessary circuits for driving the optical pickup 44 and spindle motor 45.

As shown in FIG. 12, the upper member 41 of the tray 12 has formed in the left comer surface thereof a finger insertion concavity 47 extending from the left corner towards the center of the upper member 41. This insertion concavity 47 is conveniently usable for the user of the recording and/or reproducing apparatus 1 to remove the disc 100 from on the disc table 46 by introducing a finger under the disc 100.

The upper member 41 has formed in a some half of the disc mount surface 41a thereof a plurality of slit-like air vent slits 48 extending horizontally.

Since the disc mount 46b of the disc table 46 is positioned some how higher than the disc mount surface 41a of the upper member 41 as previously mentioned, a predetermined small space is defined between the disc 100 set on the tray 12 and disc mount surface 41a to prevent an interference between the disc 100 and disc mount surface 41a when the disc 100 is spun.

However, it is known that such a small space between the disc 100 and tray 12 will provide for a thin air layer which will adversely affect playing of the disc 100. For example, when a vibration due to an acoustic pressure developed during playing of the disc 100 is transmitted to the tray 12, the vibration will be transmitted from the tray 12 to the disc 100 via the thin air layer. If the vibration thus transmitted is large, it will enlarge a focusing error, if any, of the optical pickup 44, which will cause a sound skip during disc playing.

To avoid the above, there are formed the air vent slits 48 in the disc-mount surface 41a of the tray 12 in the recording and/or reproducing apparatus 1 as mentioned above. Air existing between the disc 100 being spun and the tray 12 escapes through the air vent slits 48 into the tray 12, thus the above-mentioned thin air layer will not easily be created.

Therefore, even if a vibration caused by the acoustic pressure developed during playing of the disc 100 transmitted to the tray 12 will not easily be transmitted to the disc 100. As a result, a focusing error of the optical pickup 44 is not likely to be enlarged and thus the disc playing will not adversely be affected. A trouble during disc playing such as sound skip or the like can be prevented.

As shown in FIG. 12, the air vent slits 48 extend in one direction. Because of this simple design of the air vent slits 48, the user of the recording and/or reproducing apparatus 1 will not feel confused to see the disc mount surface 41a of the tray 12. In addition, because of their structure itself, the slits 48 can be formed in a large area of the disc mount surface 41a as compared with the non-slitted remainder of the disc mount surface 41a. Thus, air can escape through the slits 48 in an increased amount to further suppress the vibration transmission to the disc 100.

Figures 14A, 14B:
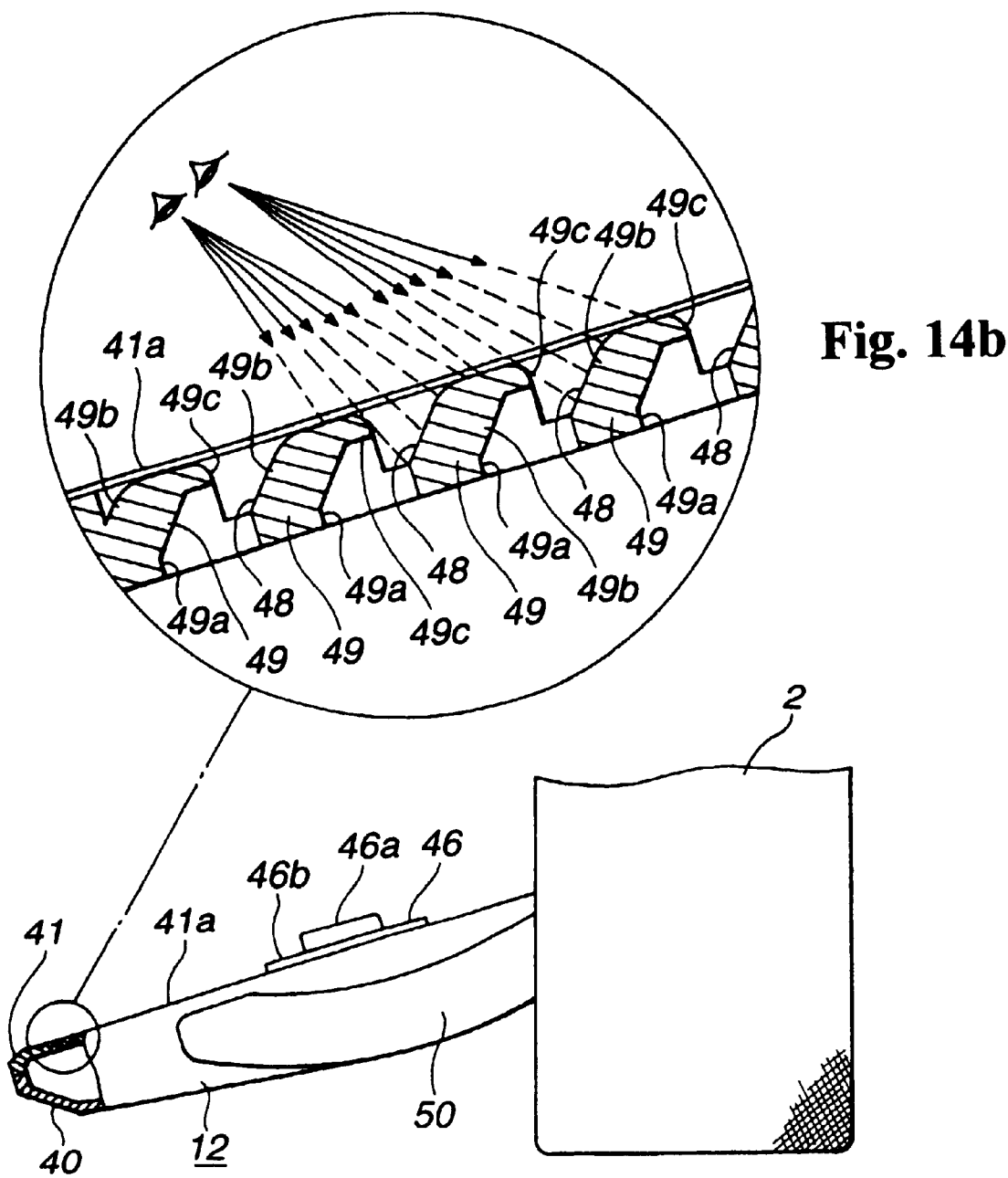
FIG. 14a and 14b is a fragmentary side elevation of the tray drawn out.

As shown in FIG. 14b, cleats 49 exist between two successive air vent slits 48. Namely, there remain the cleats 49, as non-slitted portions, between the two successive slits 48. They are formed to have a vertical section as will be described below.

Each of the cleats 49 includes a base portion 49a located inside the tray 12 and extending over a short distance in a direction perpendicular to the disc mount surface 41a, a sloped portion 49b contiguous to the base portion 49a and directed towards the rear end of the upper member 41 as it goes up, and an upper portion 49c contiguous to the sloped portion 49b and projecting slightly towards the rear end along the disc mount surface 41a.

The tray 12 is provided drawably out of the enclosure 2. When it is fully drawn out, it takes a position generally perpendicular to the front surface of the enclosure 2, namely, it is generally horizontal. With the tray 12 in this position, the user can set the disc 100 onto the tray 12 or remove it from on the tray 12. When handling the disc 100 in this way, the user will see the tray 12 in a direction indicated with solid-line arrows in FIG. 14a ( this direction will be referred to as "viewing direction" hereinafter).

Since each of the cleats 49 consists of the base portion 49a, sloped portion 49b and projecting portion 49c as mentioned above, the user can not or hardly see the internal mechanism of the tray 12 through the air vent slits 48 because it is screened by the base portion 49a, sloped portion 49b or projecting portion 49c as shown in FIG. 14b. Since the internal mechanism cannot at all or can hardly be seen by the user going to set or remove the disc 100 onto or from on the tray 12, the appearance of the tray 12 will not be esthetically spoiled.

Figure 15:
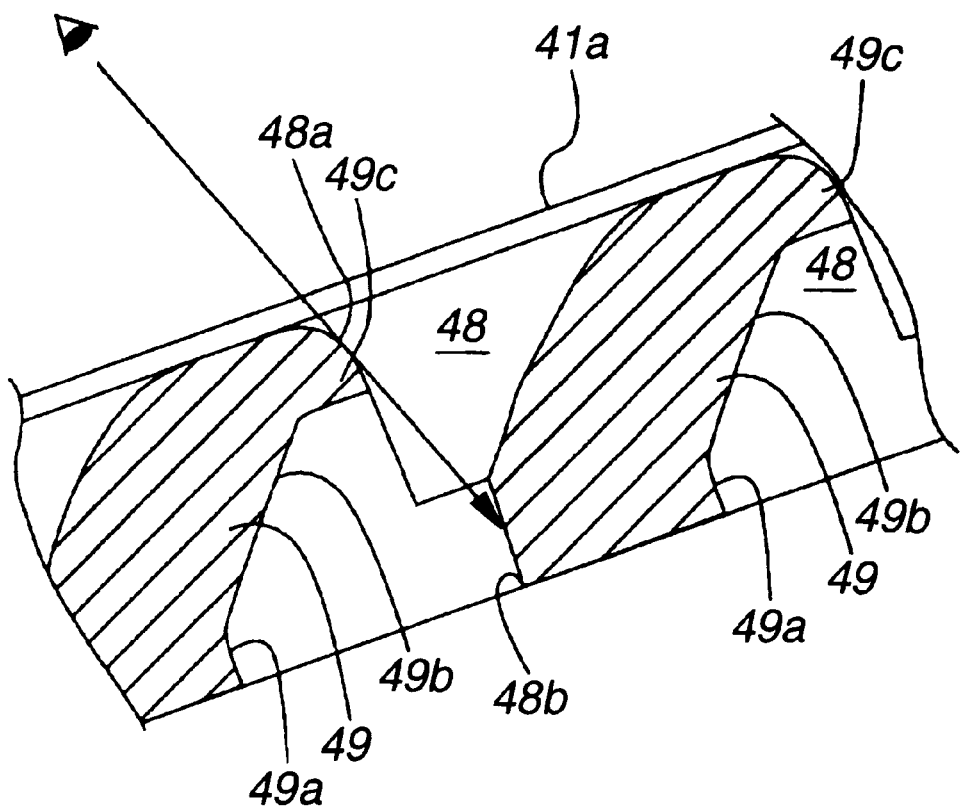
FIG. 15 is a sectional view, enlarged in scale, of the cleats.

As shown in FIG. 15, the above-mentioned design of the cleats 49 is illustrated only as an example intended to inhibit the user from looking into the internal mechanism of the tray 12. The design concept of the cleats to block the tray internal mechanism from the user's sight will be described below.

Namely, to prevent the internal mechanism of the tray 12 from being visible from outside, each cleat 49 is formed so that a portion 48a of the upper open edge of the air vent slit 48 nearest to the user (viewer) and a portion 48b is superposed on a portion 48b of the lower open edge of the air vent slit 48 farthest from the user or so that the portion 48b is located nearer to the user than the portion 48a.

Owing to the above-mentioned design of the cleats, the internal mechanism of the tray 12 is not visible from outside and thus the esthetic appearance of the tray 12 can be maintained.

Figure 16:
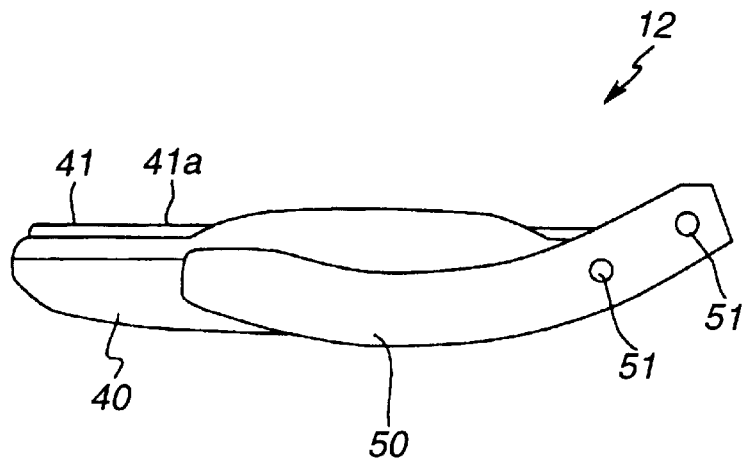
FIG. 16 is a side elevation, enlarged in scale, of the tray.

As shown in FIG. 14a, the tray 12 is provided on either side thereof with a tray holder 50. As shown mainly in FIGS. 12, 16 and 17, the tray holder 50 is formed to be convex towards the bottom of the lower member 40 and have a same curvature as that of the guide recess 31 formed in the side plate 15. It extends from a position near the front end to the rear end of the tray 12. The tray holder 50 is also designed to have a width somewhat smaller than the distance between the rear auxiliary guide edge 32 and front auxiliary guide edge 33a of the side plate 15. Further the tray holder 50 has two outward extending guide projections 51 provided on either side at the rear end and a position near the rear end thereof, respectively.

Figure 17:
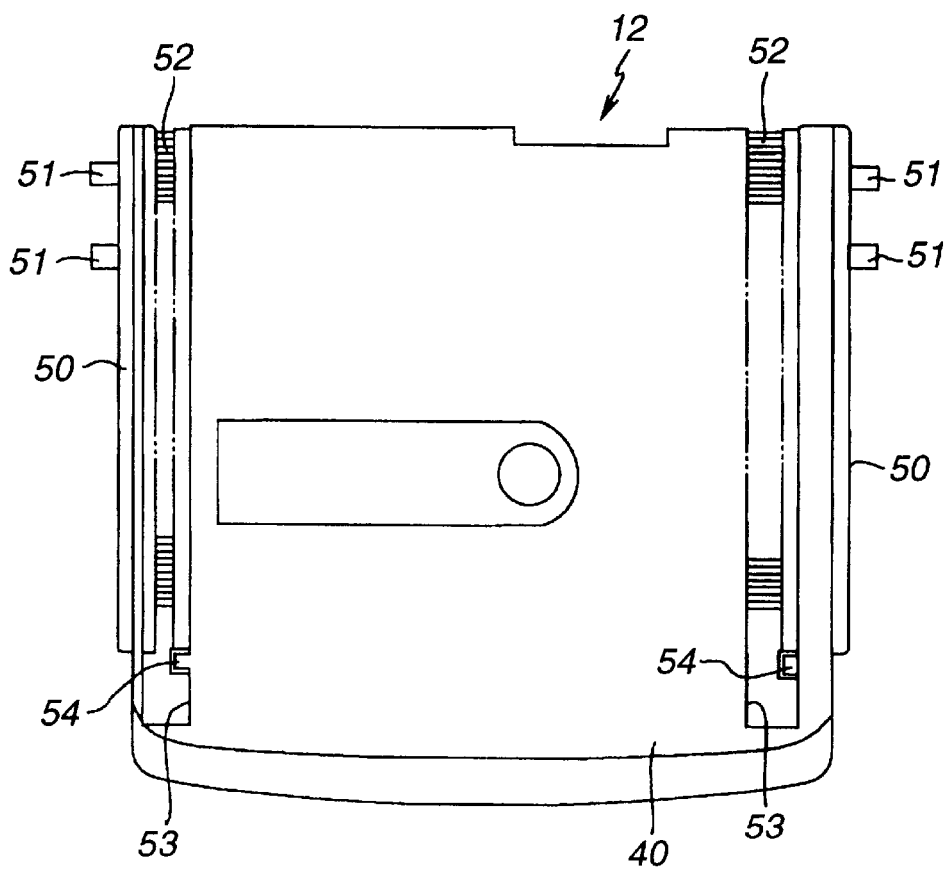
FIG. 17 is a bottom view, enlarged in scale, of the tray.

As shown in FIG. 17, the tray 12 has formed on the bottom thereof two racks 52 extending in the back-and-forth direction of the tray 12. The racks 52 are formed to extend near and along the lateral edges, respectively, of the tray 12 and from a position near the front end to the rear end of the tray 12. There is formed at the front bottom end of the lower member 40 near each lateral end a concavity 54 having a semi-circular vertical section. Also there is provided at the left lower end of each concavity 53 a sliding pin 54 projecting to the right.

The projections 51 on the holder 50 of the tray 12 is engaged slidably in the guide recess 31 formed in the side plate 15 of the support chassis 14. Thus the tray holder 50 is positioned between the rear auxiliary guide edge 32 and front auxiliary guide edge 33a formed on the side plate 15.

Figure 21:
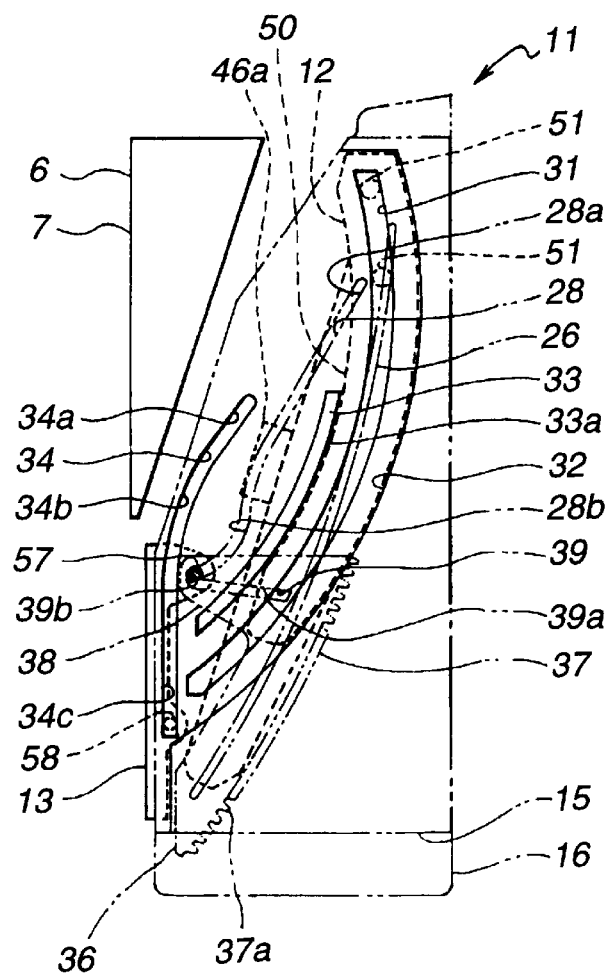
Figure 26:
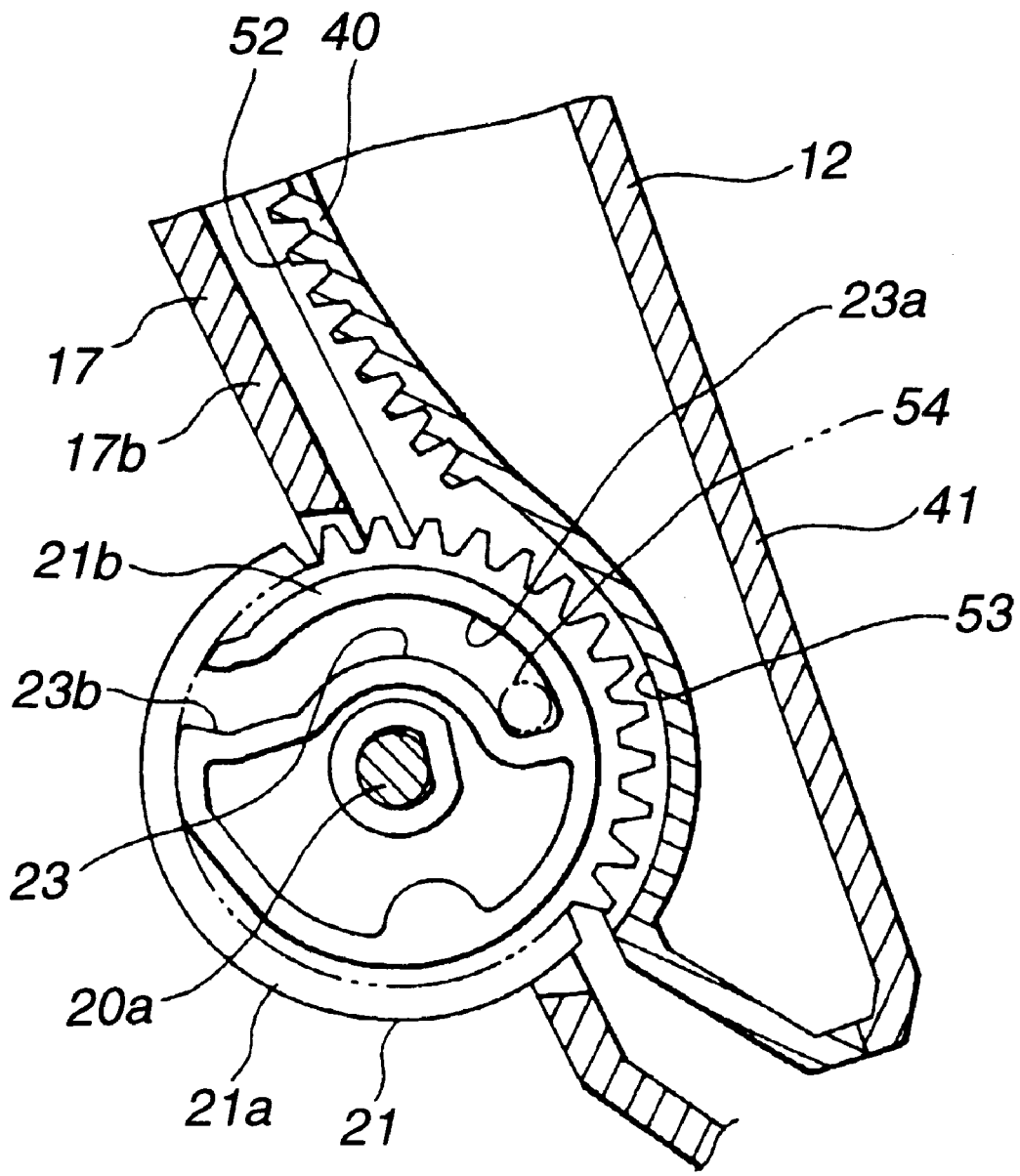

When the tray 12 is received in the enclosure 2 as will be seen from FIGS. 21 and 26, the near-end one of the projections 51 is positioned at the upper end portion of the guide recess 31, and the sliding pin 54 formed on the bottom of the lower member 40 is engaged in the cam recess 23 of the cam gear 21 of the transmission mechanism 20 and positioned at a free end of the standby part 23a opposite to an end thereof contiguous to the acting part 23b (the free end will be referred to as "one end" herebelow).

Note that when the tray 12 is received in the enclosure 2, the toothed portion 21a of the cam gear 21 is not in mesh with the rack 52 of the tray 12 but is partially located in the concavity 53 formed on the bottom of the tray, as shown in FIG. 26.

Figure 18:
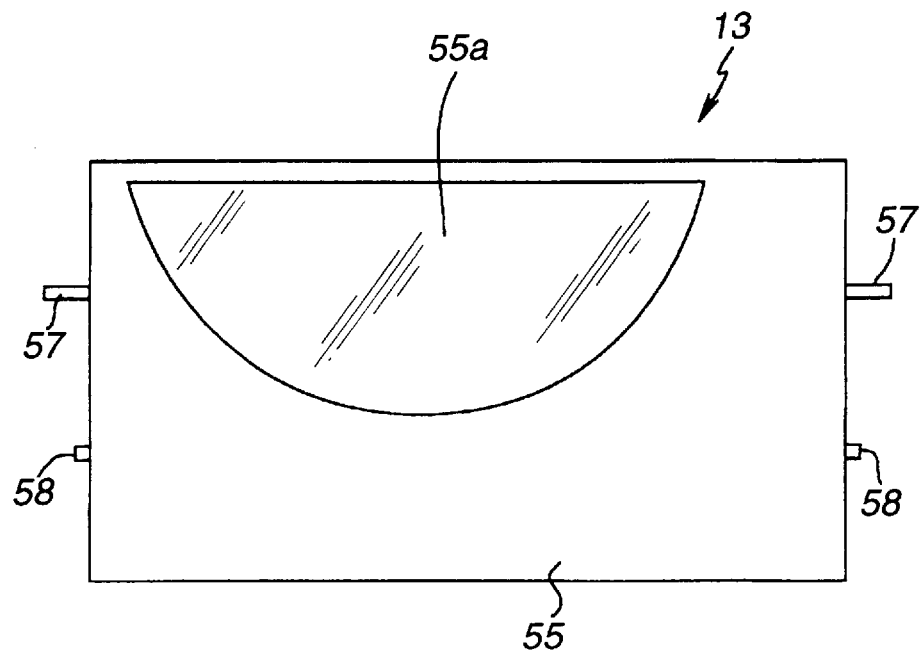
FIG. 18 is a front view, enlarged in scale, of the door.
Figure 19:
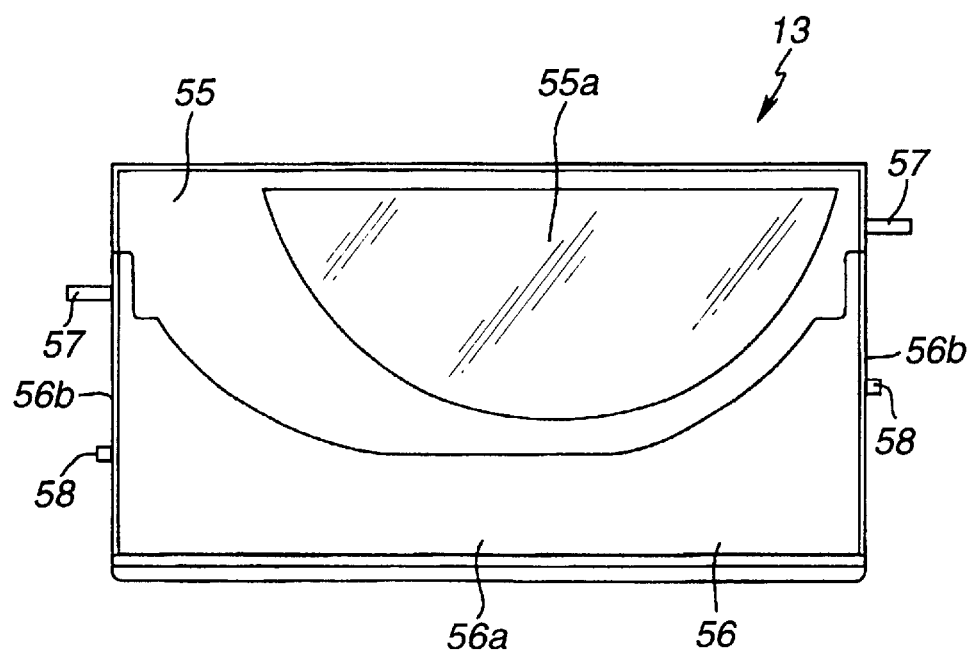
FIG. 19 is a rear view, enlarged in scale, of the door.
Figure 20:
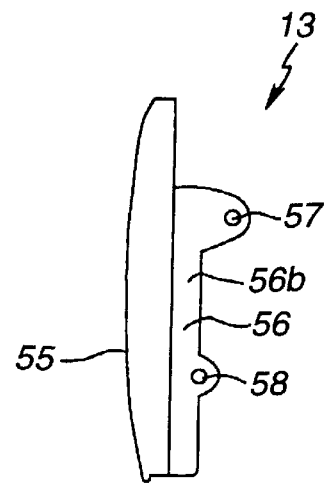
FIG. 20 is a side elevation, enlarged in scale, of the door.

As shown in FIGS. 18, 19 and 20, the door 13 includes a front main portion 55 made of a synthetic resin, and a chassis portion 56 made of a metallic material and fixed to the back of the front main portion 55.

The front main portion 55 is rectangular, of which the horizontal side is longer, as viewed from the front thereof. Its horizontal length is larger than that of the support chassis 14 while its vertical length is generally a half of that of the support chassis 14. The front main portion 55 has formed in a portion thereof a semi-circular window portion 55a made of a transparent material.

The chassis portion 56 includes a main portion 56a, and a lateral portion 56b projecting from either lateral edge of the main portion 56a. The main portion 56a of the chassis portion 56 is horizontally as long as the front main portion 55 of the door 13 not to cover the window portion 55a when it is fixed to the front main portion 55. Each of the lateral portions 56b has provided at the upper end thereof a shaft 57 projecting outward and at a position slightly higher than the lower end a pin 58 shorter than the shaft 57 and projected outward.

The shaft 57 is inserted from inside and slidable in the guide recess 28 formed in the side plate 15, and engaged slidably in the engagement hole 39 in the slider 36 supported on the outer surface of the side plate 15. The pin 58 of the door 13 is engaged slidably in the support recess 34 formed in the inner surface of the side plate 15.

As shown in FIG. 21, when the tray 12 is closed, namely, when it closes the front portion 10a of the opening 10, the shaft 57 is positioned at the lower end of the guide recess 28 as well as at the upper end of the locking part 39b of the engagement recess 39 in the slider 36. At this time, the pin 58 is positioned at the lower end of the support recess 34.

Next, the operation, closing and opening, of the door 13 when the tray 12 is received into, and drawn out of, the enclosure 2 will be described below with reference to FIGS. 21 to 30.

In the recording and/or reproducing apparatus 1 according to the present invention, the tray 12 is adapted to be received into, and drawn out of, the enclosure 2 and the door 13 is adapted to close and open the front portion 10a of the opening 10 of the enclosure 2. As will be seen from the following description, the door 13 is opened while the tray 12 received in the enclosure 2 is drawn out of the enclosure 2. On the other hand, as the drawn-out tray 12 is received into the enclosure 2, the door 13 is closed. The door opening and closing operations are effected nearly simultaneously with the tray receiving and drawing operations, respectively.

First, the drawing of the tray 12 and opening of the opening 10 by the door 13 will be described.

As described in the above, the vertical length of the front portion 10a of the opening 10 of the enclosure 2 is generally a half of that of the support chassis 14. The lower half of the support block 11 disposed inside the opening 10 is positioned generally correspondingly to the front portion 10a of the opening 10.

As previously mentioned, when the tray 12 is received in place inside the enclosure 2 as shown in FIG. 21, the door 13 is positioned to cover the front of the tray 21 and takes a position on the moving path of the tray 12. The door 13 lies in a nearly same plane as the front of the recording and/or reproducing apparatus 1 lies. When the tray 12 is received in place inside the enclosure 2, the rear one of the guide projections 51 is positioned at the upper end of the guide recess 31 and the sliding pin 54 is positioned at one end of the standby part 23a of the cam recess 23 of the cam gear 21 as shown in FIG. 26. The toothed portion 21a of the cam gear 21 is not in mesh with the rack 52 of the tray 12, On the other hand, when the door 13 closes the opening 10 as shown in FIG. 21, the shaft 57 is positioned at the lower end of the guide recess 28 and at the upper end, at the lower limit of the moving range, of the locking part 39b of the engagement hole 39 in the slider 36, and the pin 58 is positioned at the lower end of the support recess 34.

Figure 22:
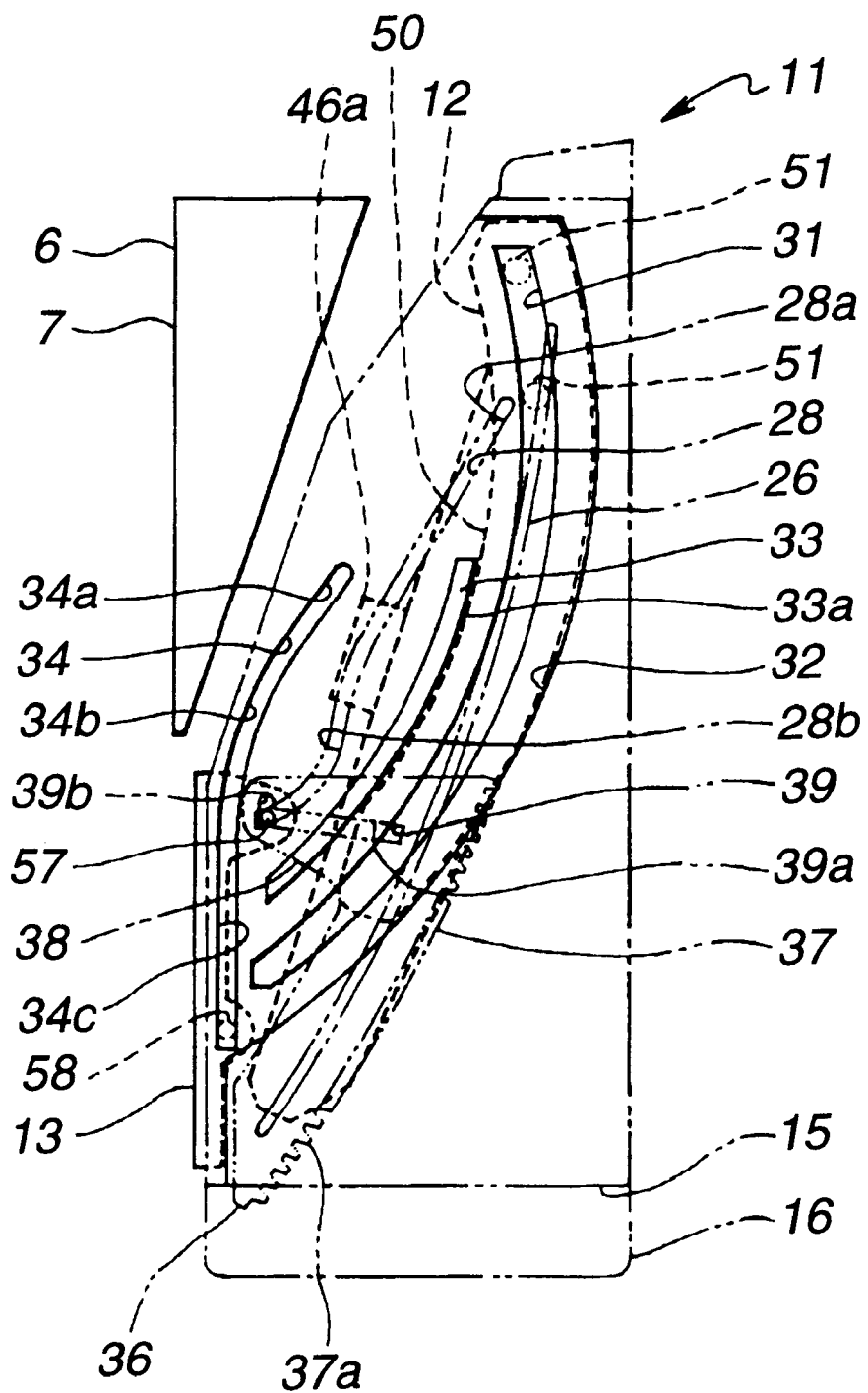

When the disc loading button located on the control panel 8 provided at the front of the enclosure 2 is pressed, the motor in the drive mechanism (not illustrated) is put into run in one directions to rotate the transmission mechanism 20 clockwise as viewed from the left. As the transmission mechanism 20 is thus rotated, the double gear 35 in mesh with the spur gear 22 is rotated and the slider 36 in mesh with the double gear 35 is guided and moved upward along the guide rail 26 on the side plate 15. When the slider 36 has thus been moved up, the shaft 57 of the door 13 is moved down relatively and positioned at the intersection of the guide part 39a with the locking part 39b of the engagement hole 39 as shown in FIG. 22 since the locking part 39b of the engagement hole 39 in the slider 36 is formed to extend generally vertically. For this while, the door 13 will not move.

Figure 27:
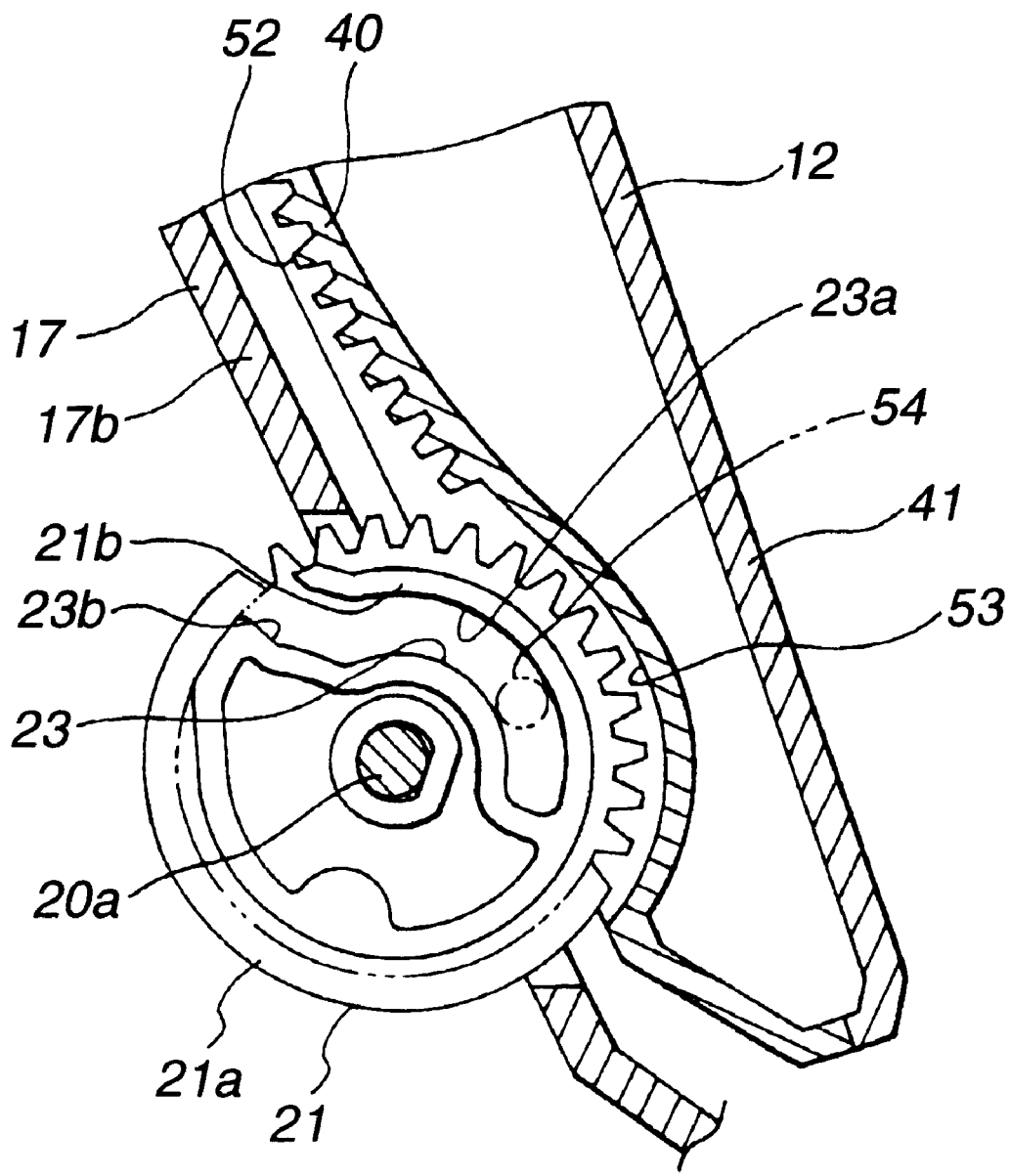

On the other hand, when the cam gear 21 of the transmission mechanism 20 is rotated, the sliding pin 54 positioned at one end of the standby part 23a of the cam recess 23 is moved relatively in a direction opposite to the rotating direction of the cam gear 21 as shown in FIG. 27. Since the standby part 23a is formed to extend circularly about the center of rotation of the cam gear 21 as having previously been described, the tray 12 having the sliding pin 54 will not be moved while the sliding pin 54 is positioned at the standby part 23a.

Figure 23:
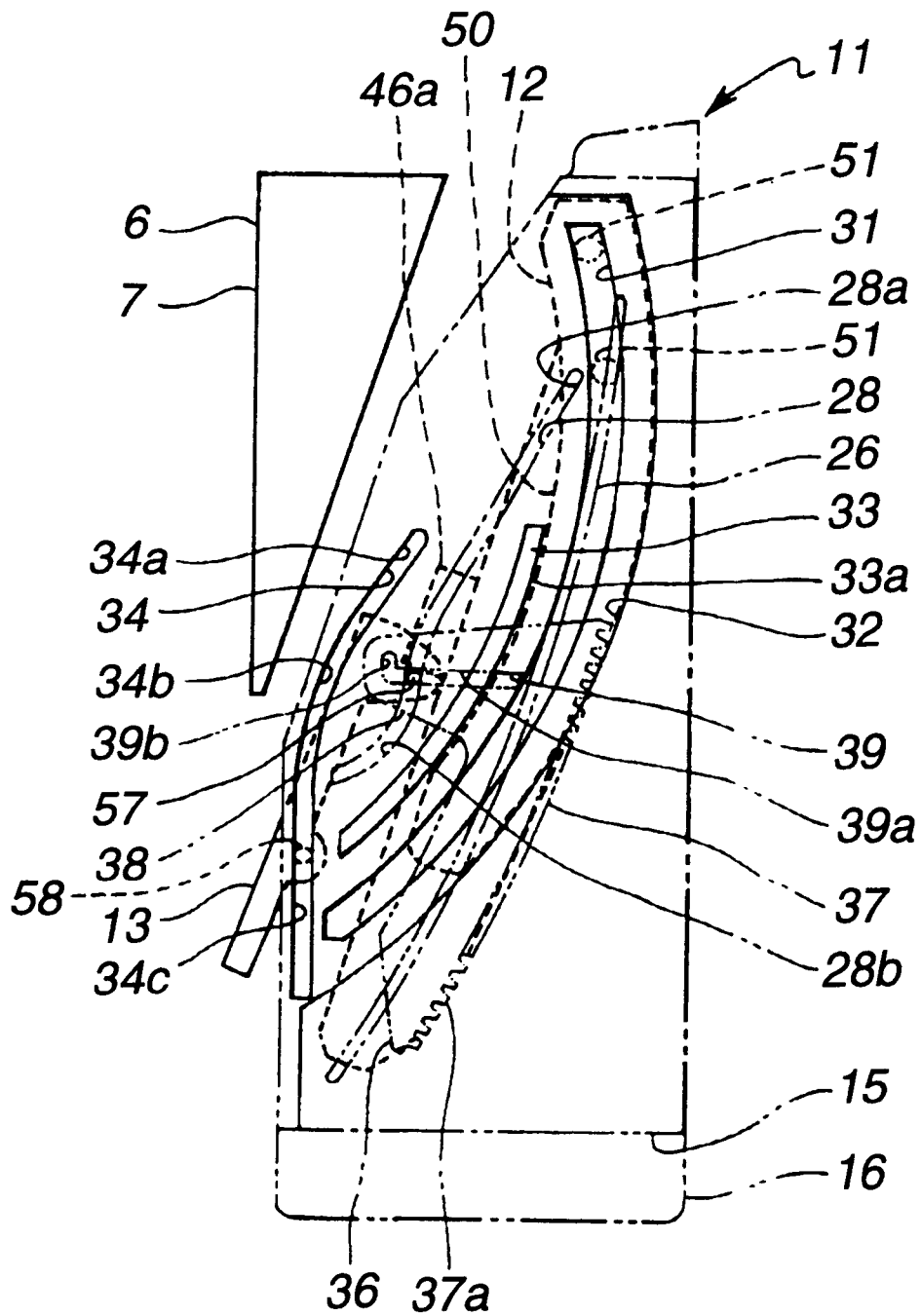

Furthermore, when the transmission mechanism 20 is rotated as shown in FIG. 23, the slider 36 is guided and moved further upward along the guide rail 26. When the slider 36 has thus been moved up, the shaft 57 of the door 13 becomes movable upward as the slider 36 is moved upward because the guide part 39a of the engagement hole 39 in the slider 36 is formed to extend generally horizontally. At this time, the shaft 57 is engaged in the circular portion 28b of the guide recess 28 in the side plate 15, the shaft 57 is forced by the guide part 39a of the engagement hole 39 to move upward along the circular portion 28b of the engagement recess 28 , thereby allowing the door 13 to move upward and start retreating from the moving path of the tray 12.

At this time, the door 13 is moved with the guide pin 58 guided along the lower straight portion 34c of the support recess 34 extending vertically as shown in FIG. 23.

The door 13 is moved with the lower end thereof positioned somewhat before the upper end since the circular portion 28b on which the shaft 57 is engaged is formed circular, being convex obliquely downward towards the back and the lower straight portion 34c of the support recess 34 on which the pin 58 is engaged is formed straight. Therefore, the upper end of the door 13 is introduced into the enclosure 2, that is, it passes by the back of the control panel 6 of the recording and/or reproducing apparatus 1 and is moved into the enclosure 2.

Figure 28:
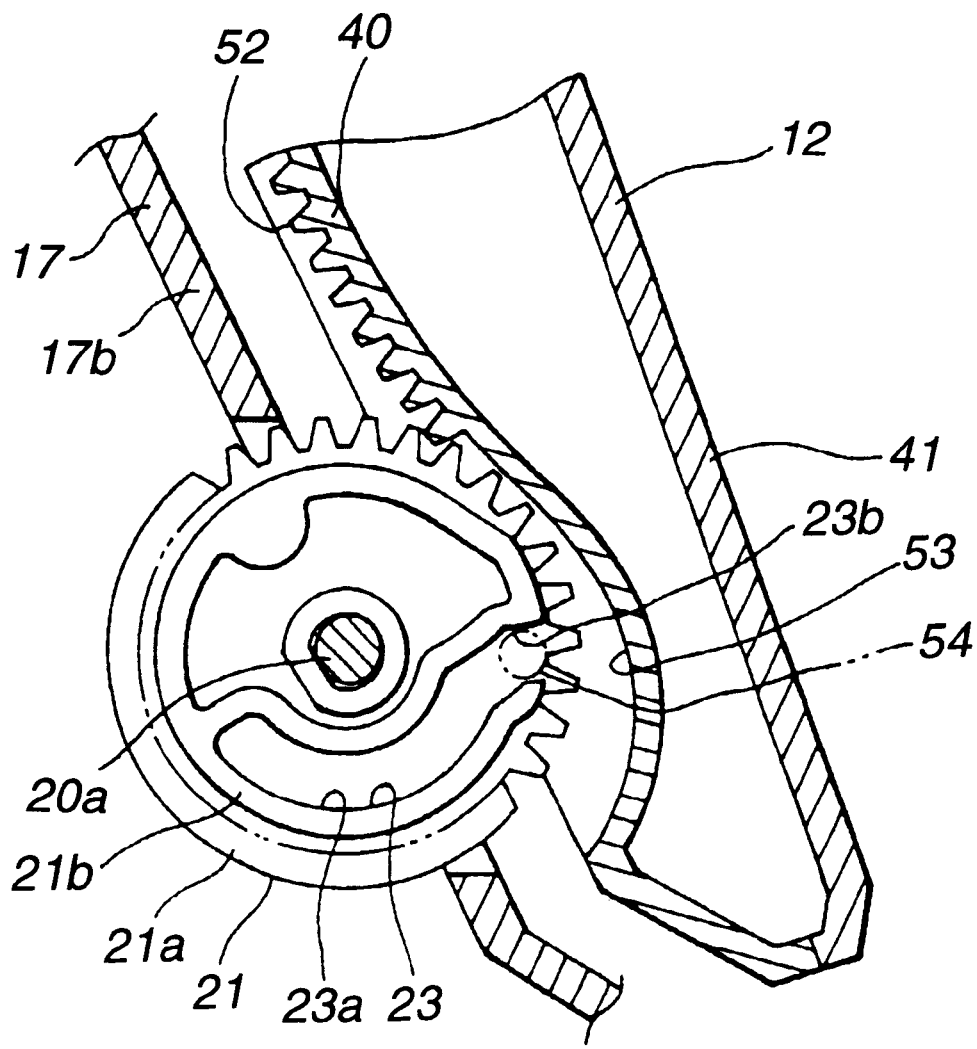

On the other hand, the cam gear 21 is rotated clockwise as shown in FIG. 28, and when the cam gear 21 has been rotated to a predetermined position, the sliding pin 54 is engaged on the acting part 23b of the cam recess 23.

Therefore, since the sliding pin 54 remains engaged on the standby part 23a of the cam recess 23 until it engages on the acting part 23b, the tray 12 will not move. The door 13 is adapted to be thus moved more early than the tray 12 for the reason that if the tray 12 and door 13 are put into motion at a same time, they will touch each other.

As shown in FIG. 28, when the sliding pin 54 is engaged on the acting part 23b and the cam gear 21 is further rotated thereafter, it is moved generally downward since the acting part 23b is formed to extend circumferentially of the cam gear 21. When the sliding pin 54 has been moved down, the tray 12 on which the sliding pin 54 is provided is moved generally downward, and the toothed portion 21a of the cam gear 21 having been idly rotated in the concavity 53 is put in mesh with the rack 52 formed on the bottom of the tray 12. Thereafter, the rack 52 is fed as the cam gear 21 rotates and the tray 12 will thus be moved.

Figure 24:
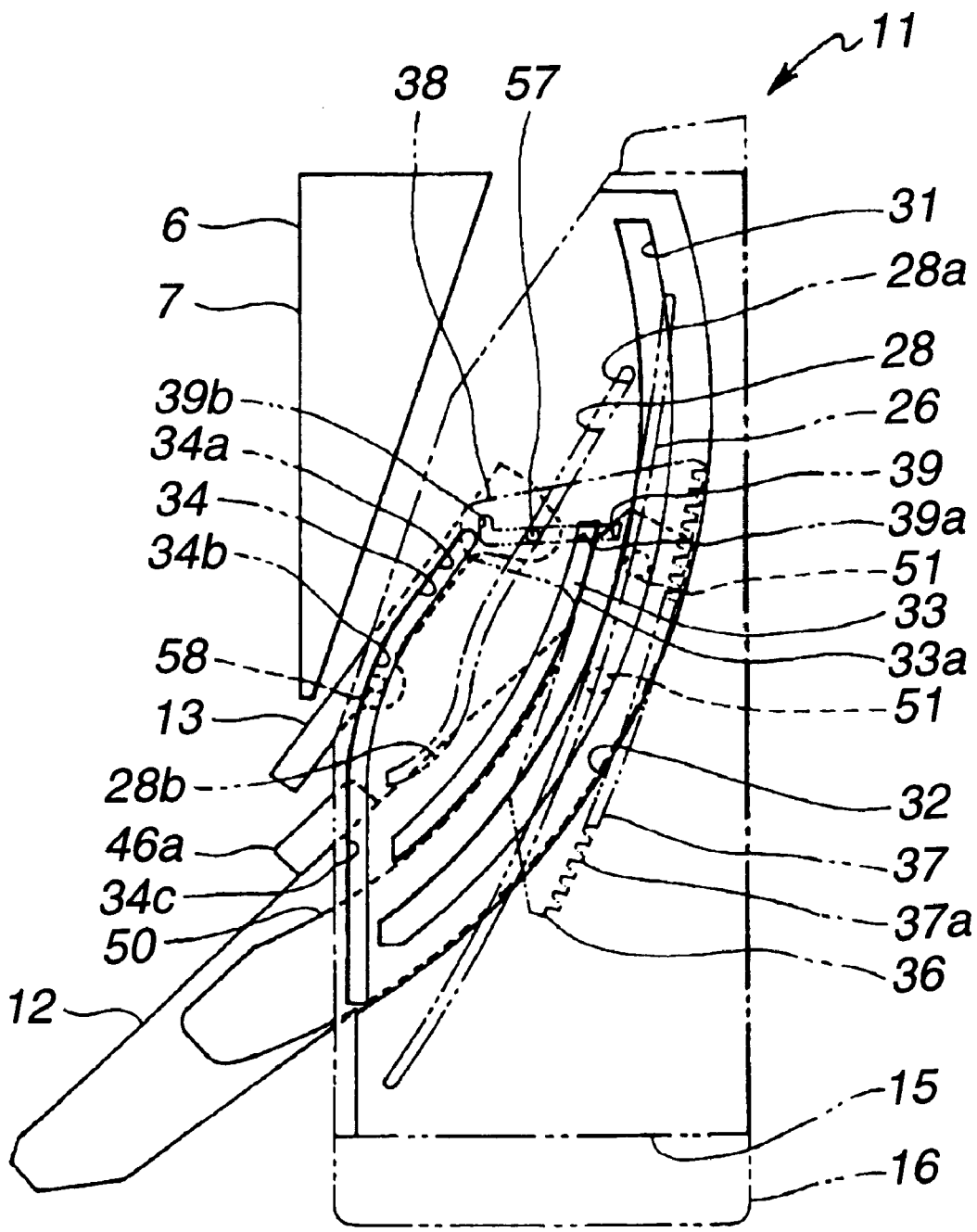

Furthermore, when the transmission mechanism 20 is rotated, the slider 36 is further moved along the guide rail 26 as shown in FIG. 24. When the slider 36 has thus been moved up, the shaft 57 is moved upward while sliding along the guide part 39a and the straight portion 28a of the guide recess 28. Thus, the door 13 is further moved upward. As shown in FIG. 24, since the door 13 is retreated from the moving path of the tray 12, the tray 12 will start projecting out to the front of the recording and/or reproducing apparatus 1, namely, from the opening 10 of the enclosure 2 without being blocked by the door 13.

At this time, the pin 58 of the door 13 is moved from the lower straight portion 34c of the support recess 34 and along the circular portion 34b. Namely, it is moved under the guidance of the portions 34b and 34c of the support recess 34.

Figure 29:
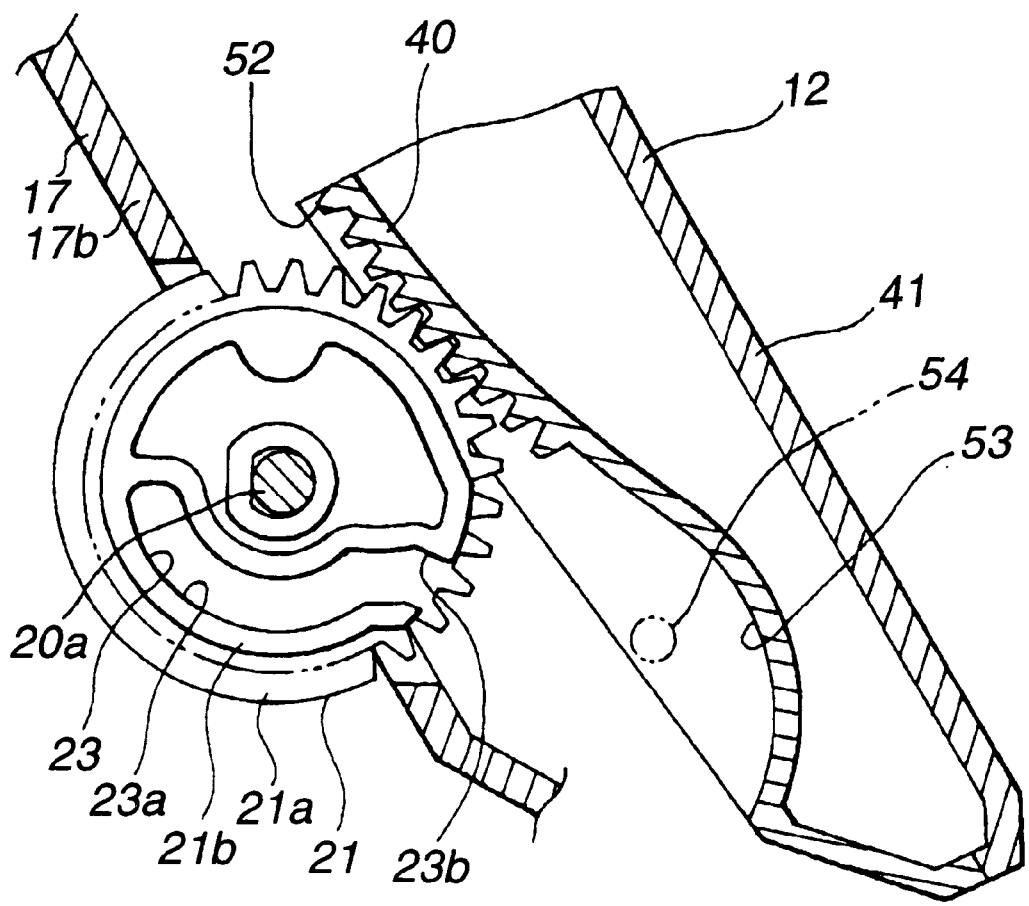

Meanwhile, the cam gear 21 is further rotated clockwise and the sliding pin 54 having engaged on the acting part 23b of the cam recess 23 slides on the acting part 23b. Thereafter, the sliding pin 54 leaves the cam recess 23 as shown in FIG. 29. Even after the sliding pin 54 has left the cam recess 23, the tray 12 is moved as the cam gear 21 is rotated because the toothed portion 21a of the cam gear 21 is in mesh with the rack 52 of the tray 12.

The tray 12 is moved along the guide recess 31 in the side plate 15 since its projection 51 is engaged in the guide recess 31. At this time, the tray holder 50 provided at either lateral side of the tray 12 is positioned between the rear auxiliary guide edge 32 and front auxiliary guide edge 33a of the tray 12, and the tray holder 50 is moved along the auxiliary guide edges 32 and 33a of the side plate 15 and over these edges.

Note that the tray 12 is adapted to be moved along not only the projection 51 but along the tray holder 50 for the reason that if the tray 12, etc. being moved is applied with an external vibration o r the like because the projection 51 having a relatively small diameter and the tray 12 on which the projection 51 is provided it will possibly be broken. Namely, in this case, the tray holder 50 having a relatively large width and large length reinforces the projection 51 against such a breakage.

As mentioned above, the tray 12 has the projection 51 moved along the guide recess 1. However, since the lower ends of the guide recess 31, rear and front auxiliary guide edges 32 and 33a are positioned before the upper ends and circularly convex obliquely downward towards the back, the tray 12 is moved gradually toward its horizontal position, namely, its disc mount surface 41a is gradually directed upward.

Figure 25:
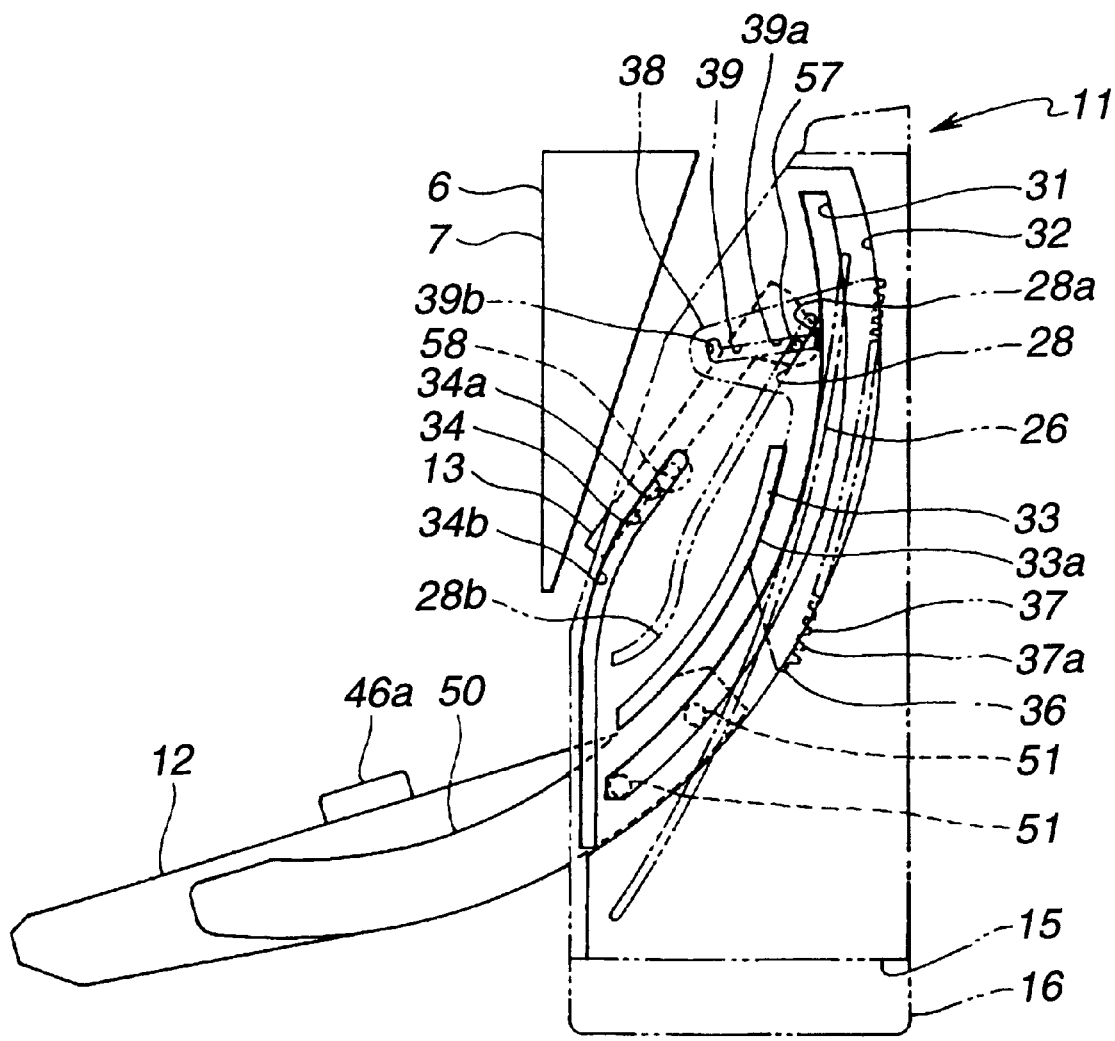

As the transmission mechanism 20 is rotated, the slider 36 is moved along the guide rail 26 and moved up to the upper limit of its moving range as shown in FIG. 25. When the slider 36 is moved up, the shaft 57 is moved sliding on the guide part 39a of the slider 36 and the straight portion 28a of the guide hole 28, whereby the door 13 is moved to the upper limit of its moving range, namely, to its opened position, so that the front portion 10a of the opening 10 is fully opened.

At this time, the pin 58 of the door 13 is passed along the upper straight portion 34a from the circular portion 34b of the support recess 34 up to the upper limit of its moving range under the guidance of the portions 34b and 34a.

Meanwhile, the cam gear 21 is further rotated clockwise, the tray 12 is moved to the front end of its moving range, or to the drawn-out position, with its projection 51 guided by the guide recess 31 and its tray holder 50 guided by the rear and front auxiliary guide edges 32 and 33a as the cam gear 21 is rotated.

At the drawn-out position, the tray 12 takes a generally horizontal position. The disc 100 is set by the user onto the tray 12 in this position.

Next, how the tray 12 is received into the enclosure 2 and the door 13 is closed will be described below.

The reception of the tray 12 into the enclosure 2 and closing of the door 13 are started by pressing the eject button provided on the front surface of the enclosure 2. The motor of the drive mechanism (not shown) is put into run in an opposite direction to that in which the motor is put into motion as having been described concerning the reception of the tray 12 into the enclosure 2 and opening of the door 13 and the transmission mechanism 20 is rotated counterclockwise as viewed from the left.

That is to say, when the transmission mechanism 20 is rotated counterclockwise, the double gear 35 in mesh with the spur gear 22 is rotated and the slider 36 in mesh with the double gear 35 is moved down along the guide rail 26 on the side plate 15. When the slider 36 has been moved down along the guide rail 26, the door 13 has the shaft 57 moved along the guide hole 28 and pin 58 moved along the support recess 34, and the door 13 is thus moved downward. At this time, the shaft 57 is moved down sliding on the guide part 39a of the engagement hole 39 in the slider 36 as well as along the guide hole 28. When the shaft 57 is positioned at the intersection of the guide part 39a with the locking part 39b, the door 13 is stopped and positioned in the closed position while facing the front surface of the tray 12, or the disc 100 set on the tray 12.

Figure 30:
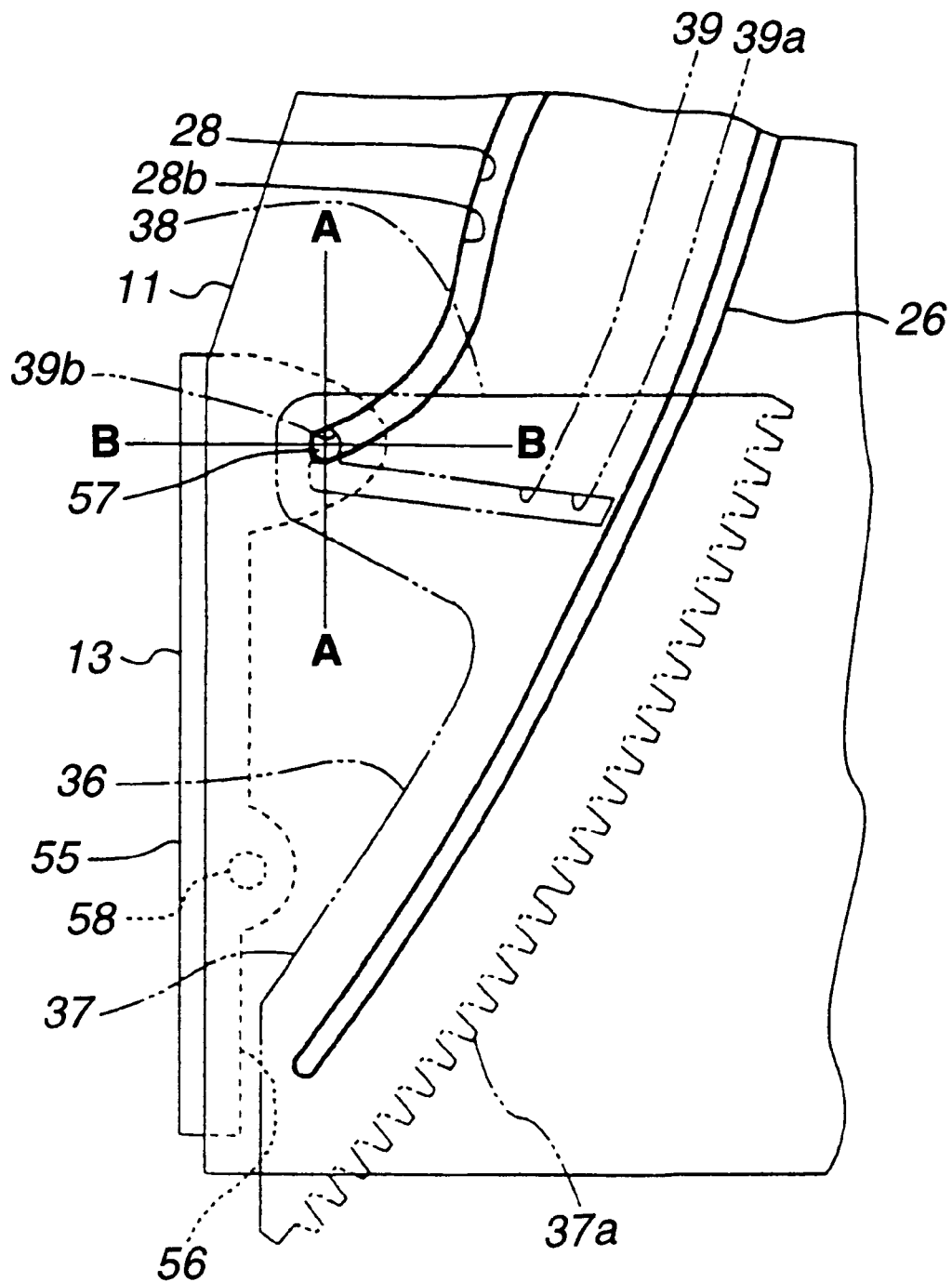
FIG. 30 is a sectional view, enlarged in scale, showing the door locked in the closed position.

The door 13 is not moved any longer while the transmission mechanism 20 is further rotated counterclockwise. As the transmission mechanism 20 rotates, the slider 36 is moved downward and the shaft 57 of the door 13 is moved relatively upward in the locking part 39b formed to extend generally upward as shown in FIGS. 21 or 30. When the shaft 57 is positioned at the upper end and locked at the upper end of the locking part 39b, the motor is stopped from running and thus the transmission mechanism 20 is stopped from rotating.

The locking part 39b of the slider 36 is formed to extend in a different direction from the extending direction of the lower end of the guide hole 28 at which the shaft 57 of the door 13 at the closed position of the opening 10 stays. The locking part 39b formed on the slider 36 contributes to prevention of the shaft 57 from wobbling in the extending direction of the guide hole 28 and to prevention of the door 13 at the closed position of the opening 10 from wobbling.

In the recording and/or reproducing apparatus 1 according to the present invention, the locking part 39b is formed on the slider 36 is a part of the mechanism which opens and closes the door 13. Therefore, separate operating and locking mechanisms may not be provided for the door 13. Thus it is possible to reduce the number of necessary component parts and the manufacturing costs of the apparatus 1.

Further, since it is not necessary to assure spaces for providing such mechanisms, respectively, the apparatus 1 can be designed more compact.

As shown in FIG. 30, the direction A—A in which the locking part 39b of the slider 36 extends is perpendicular to the direction B—B in which the lower end of the guide hole 28 extends. Thus, the door 13 hardly wobbles at the closed position.

More particularly, if the door 13 wobbles at the closed position, a sound uncomfortable to the user will be generated and the wobbling will cause a vibration which will adversely affect the playing of the disc 100 since the disc 100 is played with the door 13 closed. According to the present invention, however, the locking part 39b of the slider 36 securely locks the door 13 in the closed position, thereby preventing the above-mentioned noise and vibration adversely affecting the disc playing.

On the other hand, when the transmission mechanism 20 is rotated counterclockwise and the door 13 is moved down, the tray 12 is simultaneously moved towards the received position with the disc 100 set on the tray 12 kept facing outside the apparatus 1. The tray 12 is moved as the cam gear 21 in mesh with the rack 52 of the tray 12 is rotated, the projection 51 is moved along the guide recess 31, and the tray holder 50 is guided by the rear and front auxiliary guide edges 32 and 33a. Thus, the tray 12 is gradually moved to an inverted position, namely, to an upright position generally parallel to the front of the apparatus 1.

When the tray 12 is moved to the received position and takes the generally upright position parallel to the front of the apparatus 1, the toothed portion 21a of the cam gear 21 is disengaged from the track 52. At this time, the sliding pin 54 of the tray 12 has been moved to the standby part 23a via the acting part 23b of the cam recess 23 in the cam gear 21. When the sliding pin 54 is positioned at one end of the standby part 23a as the cam gear 21 rotates, the motor is stopped from running, whereby the transmission mechanism 20 is stopped from rotating.

When the door 13 is closed and the tray 12 is received inside the enclosure 2, the replay button on the control panel 6 is pressed by the user to start playing of the disc 100.

The apparatus 1 according to the present invention is adapted so that when the tray 12 is drawn out of the enclosure 2, the door 13 is simultaneously moved to the position where the opening 10 is opened, and that when the tray 12 is introduced into the enclosure 2, the door 13 is simultaneously moved to the position where the opening 10 is closed. Therefore, the tray 12 and door 13 are moved as interlocked with each other, so that the operating time can be reduced.

When moved to the position where the opening 10 is open, the door 13 is positioned inside the apparatus 1 as shown in FIG. 25. Therefore, a free space is available in front of the apparatus 1 and a space is available for provision, at the front of the apparatus 1, of each part thereof. The apparatus 1 can thus be designed correspondingly more compact.

Furthermore, since the door 13 is receivable inside the enclosure 2, advantageously, the front surface of the apparatus 1 does not appear strange and the aesthetic appearance of the apparatus 1 is not impaired, which are different from any other apparatus designed so that a tray corresponding to the tray 12 is moved between the open and closed positions at the front of the apparatus.

As shown in FIG. 1, the control panel 6 and display 7 are disposed at the front of the enclosure 2, opposite to the door 13 moved in the apparatus 1 to the position where the opening 10 is open. Thus the door 12 is not positioned in front of the control panel 6 and display 7 with the opening 10 being open. Therefore, the control panel 6 can be easily operated.

In the recording and/or reproducing apparatus 1 according to the present invention, when the door 13 is moved to the closed position and tray 12 is moved to the received position in the enclosure 2, the tray 12 is positioned for the disc mount surface 41a thereof to be generally upright. Therefore, the apparatus 1 can be designed to have a reduced depth, which leads to a more compact design of the apparatus 1 Also, when the door 13 is moved to the position where the opening 10 is-closed and tray 12 is moved out of the enclosure 2 to the drawn-out position, the tray 12 is positioned for the disc mount surface 41a thereof to be generally horizontal. Thus, the user can easily set the disc 100 onto the tray 12. When in the drawn-out position, the tray 12 is positioned horizontally, so that the disc 100 being set onto the tray 12 can be prevented from slipping down from on the tray 12 and thus being scratched or otherwise damaged.

What is claimed is:

1. A disc recording and/or reproducing apparatus, comprising:
    an opening formed in a surface of the apparatus, said surface forming an exterior side of said apparatus;
    a closing member to close and disclose the opening;
    a tray having a substantially planar disc mount surface adapted to receive a disc thereon and move between a first tray position where the tray is projected from the opening and is oriented generally perpendicular to a planar extrapolation of said surface of the apparatus and a second tray position where the tray is retracted into the apparatus through the opening and is oriented generally parallel to said planar extrapolation; and
    a drive mechanism adapted to move the closing member between a first closing member position where the closing member closes the opening and a second closing member position where the closing member discloses the opening, and the tray between the above-mentioned first and second tray positions,
    wherein a tangent to a path defined for said movement of said tray between said first and second tray positions is substantially parallel to a said planar disc mount surface of said moving tray and disc.

2. The disc recording and/or reproducing apparatus as set forth in claim 1, wherein the drive mechanism is adapted to move the closing member from the first closing member position to the second closing member position, and then to move the tray from the second tray position to the first tray position.

3. The disc recording and/or reproducing apparatus as set forth in claim 2, wherein the closing member is adapted to move between the first closing member position where it lies in a generally same plane as the planar extrapolation and the second closing member position where it is located inside the apparatus to disclose the opening.

4. The disc recording and/or reproducing apparatus as set forth in claim 1, wherein the drive mechanism is provided with a slider adapted to move the closing member between the first and second closing member positions, and a drive gear to move the slider.

5. The disc recording and/or reproducing apparatus as set forth in claim 4, wherein the drive gear has a gear provided with a cam adapted to move the tray between the first and second tray positions.

6. The disc recording and/or reproducing apparatus as set forth in claim 4, further comprising:
    a frame provided with a guiding member to guide the slider from a first slider position corresponding to the first closing member position to a second slider position corresponding to the second closing member position.

7. The disc recording and/or reproducing apparatus as set forth in claim 6, wherein the guiding member has means for locking the closing member at the first closing member position.

8. The disc recording and/or reproducing apparatus as set forth in claim 6, wherein the guiding member is provided with a tray guide adapted to guide the tray moving between the first and second tray positions.

9. The disc recording and/or reproducing apparatus as set forth in claim 1, wherein the tray includes a disc mount surface upon which said disc is to be mounted, said disc mount surface having formed therein a plurality of slits extending in a first direction, said plurality of slits being proximately and adjacently disposed in parallel over the entirety of a second direction in parallel to the first direction.

10. The disc recording and/or reproducing apparatus as set forth in claim 9, wherein the tray is provided with a recording and/or reproducing head for recording to and/or reproducing from said disc.

11. The disc recording and/or reproducing apparatus as set forth in claim 9, said plurality of slits being proximately and adjacently disposed in parallel over the entirety of a second direction orthogonal to the first direction.

12. A disc recording and/or reproducing apparatus, comprising:
    an opening formed in a surface of the apparatus, said surface forming an exterior side of said apparatus;
    a closing member to close and disclose the opening and adapted to move between a first closing member position where it closes the opening and lies in a generally same plane as a planar extrapolation of said surface of the apparatus and a second closing member position where it is located inside the apparatus to disclose the opening;
    a tray having a substantially planar disc mount surface adapted to receive a disc thereon and move between a first tray position where the tray is projected from the opening and is oriented substantially perpendicular to said planar extrapolation, and a second tray position where the tray is retracted into the apparatus through the opening and is rotated with respect to the first tray position; and
    a drive mechanism adapted to move the closing member between the second closing member position and the first closing member position, and the tray between the above-mentioned first and second tray positions,
    wherein a tangent to a path defined for said movement of said tray between said first and second tray positions is substantially parallel to of said moving tray and disc.

13. The disc recording and/or reproducing apparatus as set forth in claim 12, wherein the drive mechanism is adapted to move the closing member between the second closing member position and the first closing member position, and then move the tray from the second tray position to the first tray position.

14. The disc recording and/or reproducing apparatus as set forth in claim 13, wherein the tray is adapted to move between the first tray position where the tray is projected from the opening and is generally perpendicular to the planar extrapolation and a second tray position where the tray is retracted into the apparatus through the opening and is generally parallel to the planar extrapolation.

15. The disc recording and/or reproducing apparatus as set forth in claim 12, wherein the drive mechanism is provided with a slider adapted to move the closing member between the first and second closing member positions, and a drive gear to move the slider.

16. The disc recording and/or reproducing apparatus as set forth in claim 15, wherein the drive gear has a gear provided with a cam adapted to move the tray between the first and second tray positions.

17. The disc recording and/or reproducing apparatus as set forth in claim 16, further comprising:
a frame provided with a guiding member to guide the slider from a first slider position corresponding to the first closing member position to a second slider position corresponding to the second closing member position.

18. The disc recording and/or reproducing apparatus as set forth in claim 17, wherein the guiding member has means for locking the closing member at the first closing member position.

19. The disc recording and/or reproducing apparatus as set forth in claim 17, wherein the guiding member is provided with a tray guide adapted to guide the tray moving between the first and second tray positions.

20. The disc recording and/or reproducing apparatus as set forth in claim 11, wherein the tray includes a disc mount surface upon which said disc is to be mounted, said disc mount surface having formed therein a plurality of slits extending in a first direction, said plurality of slits being proximately and adjacently disposed in parallel over the entirety of a second direction in parallel to the first direction.

21. The disc recording and/or reproducing apparatus as set forth in claim 20, wherein the tray is provided with a recording and/or reproducing head for recording to and/or reproducing from said disc.

22. The disc recording and/or reproducing apparatus as set forth in claim 20, said plurality of slits being proximately and adjacently disposed in parallel over the entirety of a second direction orthogonal to the first direction.

23. A disc loading apparatus, comprising:
a tray having a substantially planar disc mount surface on which a disc is to be set and adapted to move between a first tray position where the disc mount surface is generally horizontal and a second tray position where the disc mount surface is generally vertical;
a drive mechanism adapted to move the tray between the first and second tray positions; and
a guiding member to guide the tray being moved by the drive mechanism between the first and second tray positions,
wherein a tangent to a path defined for said movement of said tray between said first and second tray positions is substantially parallel to said planar disc mount surface of said moving tray.

24. The disc loading apparatus as set forth in claim 23, wherein the drive mechanism has a gear provided with a cam adapted to move the tray between the first and second tray positions.

25. The disc loading apparatus as set forth in claim 23, wherein the tray includes a disc mount surface upon which said disc is to mounted, said disc mount surface having formed therein a plurality of slits extending in a first direection, said plurality of slits being proximately and adjacently disposed in parallel over the entirety of a second direction in parallel to the first direction.

26. The disc recording and/or reproducing apparatus as set forth in claim 25, said plurality of slits being proximately and adjacently disposed in parallel over the entirety of a second direction orthogonal to the first direction.

27. The disc loading apparatus as set forth in claim 23, further comprising:
a closing member to cover the front of the tray in a first closing member position when the tray is in the first tray position, the closing member being movable by the drive mechanism to a second closing member position to which the closing member is withdrawn from the moving path of the tray when the tray is moved between the first and second tray positions.

28. The disc loading apparatus as set forth in claim 27, wherein the closing member is movable from the second closing member position to which the closings member is withdrawn from the moving path of the tray when the tray is moved between the first and second tray positions, to the first closing member position where the closing member covers the front of the tray when the tray is in the first tray position.

29. The disc loading apparatus as set forth in claim 23, wherein the guiding member is adapted to guide the tray for movement between the first and second tray positions with the disc mount surface of the tray kept directed outwardly of the apparatus.

30. A disc loading apparatus, comprising:
a tray having a disc mount surface on which a disc is to be set and adapted to move between a first tray position where the disc mount surface is generally horizontal and a second tray position where the disc mount surface is generally vertical;
a drive mechanism adapted to move the tray between the first and second tray positions;
a guiding member to guide the tray being moved by the drive mechanism between the first and second tray positions
a closing member to cover the front of the tray in a first closing member position when the tray is in the first tray position, the closing member being movable by the drive mechanism to a second closing member position to which the closing member is withdrawn from the moving path of the tray when the tray is moved between the first and second tray positions,
wherein the closing member is movable from the second closing member position to which the closing member is withdrawn from the moving path of the tray when the tray is moved between the first and second tray positions, to the first closing member position where the closing member covers the front of the tray when the tray is in the first tray position,
wherein the drive mechanism is adapted to move the tray from the second tray position to the first tray position after the closing member is withdrawn from the moving path of the tray.

31. The disc loading apparatus as set forth in claim 30, wherein the drive mechanism has a slider to move the closing member between the first and second closing member positions.

32. A disc loading apparatus, comprising:
- a tray having a substantially planar disc mount surface on which a disc is to be set and adapted to move between a first position where the disc mount surface thereof is generally horizontal and a second position where the disc mount surface thereof is generally vertical;
- a drive mechanism adapted to move the tray between the first and second positions;
- a guiding member to guide the tray being moved by the drive mechanism between the first and second positions; and.
- a closing member to cover the front of the tray staying in the second position, the closing member being movable by the drive mechanism to a second closing member position to which the closing member is withdrawn from the moving path segment of the tray when the tray is moved between the first and second tray positions,
- wherein a tangent to a path defined for said movement of said tray between said first and second tray positions is substantially parallel to said planar disc mount surface of said moving tray and disc.

33. The disc loading apparatus as set forth in claim 32, wherein the closing member is movable from the position to which it is withdrawn from the moving path segment of the tray when the tray is moved from the first position to the second position, to the position where the closing member covers the front of the tray staying in the second position.

34. A disc loading apparatus, comprising:
- a tray having a disc mount surface on which a disc is to be set and adapted to move between a first position where the disc mount surface thereof is generally horizontal and a second position where the disc mount surface thereof is generally perpendicular to the disc mount surface of the tray staying in the first position;
- a drive mechanism adapted to move the tray between the first and second positions;
- a guiding member to guide the tray being moved by the drive mechanism between the first and second positions; and
- a closing member to cover the front of the tray staying in the second position, the closing member being movable by the drive mechanism to a second closing member position to which the closing member is withdrawn from the moving path segment of the tray when the tray is moved between the first and second tray positions,
- wherein the closing member is movable from the position to which it is withdrawn from the moving path segment of the tray when the tray is moved from the first position to the second position, to the position where the closing member covers the front of the tray staying in the second position, and
- wherein the drive mechanism is adapted to move the tray from the second position to the first position after the closing member is withdrawn from the moving path of the tray.

35. The disc loading apparatus as set forth in claim 34, wherein the drive mechanism has a slider to move the closing member between the position to which the closing member is withdrawn from the moving path of the tray and the position where the closing member covers the front of the tray.

* * * * *